United States Patent [19]
Togino

[11] Patent Number: 5,517,366
[45] Date of Patent: May 14, 1996

[54] CONCENTRIC OPTICAL SYSTEM

[75] Inventor: Takayoshi Togino, Koganei, Japan

[73] Assignee: Olympus Optical Co., Ltd., Tokyo, Japan

[21] Appl. No.: 326,951

[22] Filed: Oct. 21, 1994

[30]     Foreign Application Priority Data

Oct. 22, 1993  [JP]  Japan ................... 5-264828

[51] Int. Cl.⁶ ............... G02B 17/00; G02B 5/30; G02B 3/00; G02B 5/08
[52] U.S. Cl. ............ 359/850; 359/364; 359/365; 359/366; 359/497; 359/642; 359/726; 359/727; 359/728; 359/853; 359/858
[58] Field of Search ................ 359/850, 497, 359/487, 711, 853, 858, 364, 365, 366, 642, 645, 646, 727, 726, 729, 728, 739, 738, 839, 631, 633

[56]           References Cited

U.S. PATENT DOCUMENTS 3,065,670  11/1962  Becker ................. 359/724
3,752,559   8/1973  Fletcher et al. ......... 359/366
4,226,501  10/1980  Shafer ................. 359/366
4,235,508  11/1980  Kaprelian ............. 359/366

*Primary Examiner*—Paul M. Dzierzynski
*Assistant Examiner*—Mohammad Y. Sikder
*Attorney, Agent, or Firm*—Cushman, Darby & Cushman

[57]            ABSTRACT

A concentric optical system usable as either an imaging optical system or an ocular optical system, which has an F-number of 1.5 to 3 and enables a flat and clear image to be photographed or observed at a view angle of up to 60° or more with substantially no aberration. The concentric optical system includes at least two semitransparent reflecting surfaces (2) and (3) each having a center of curvature disposed in the vicinity of a pupil (1) and a concave surface directed toward the pupil. The semitransparent reflecting surfaces are disposed so that each semitransparent reflecting surface passes each particular bundle of light rays at least once and reflects them at least once, thereby providing a flat image surface (4).

6 Claims, 19 Drawing Sheets

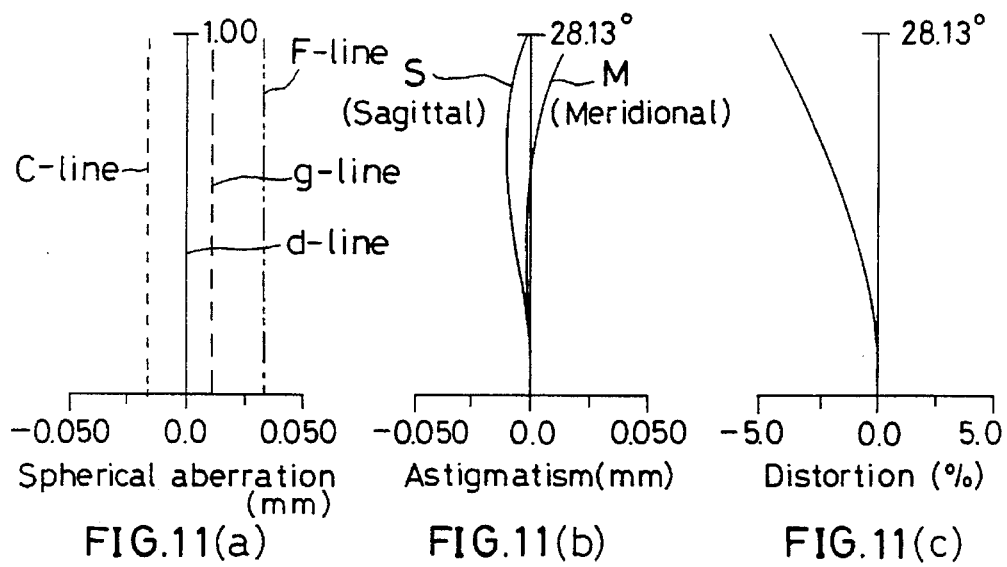
FIG.11(a) Spherical aberration (mm)
FIG.11(b) Astigmatism (mm)
FIG.11(c) Distortion (%)
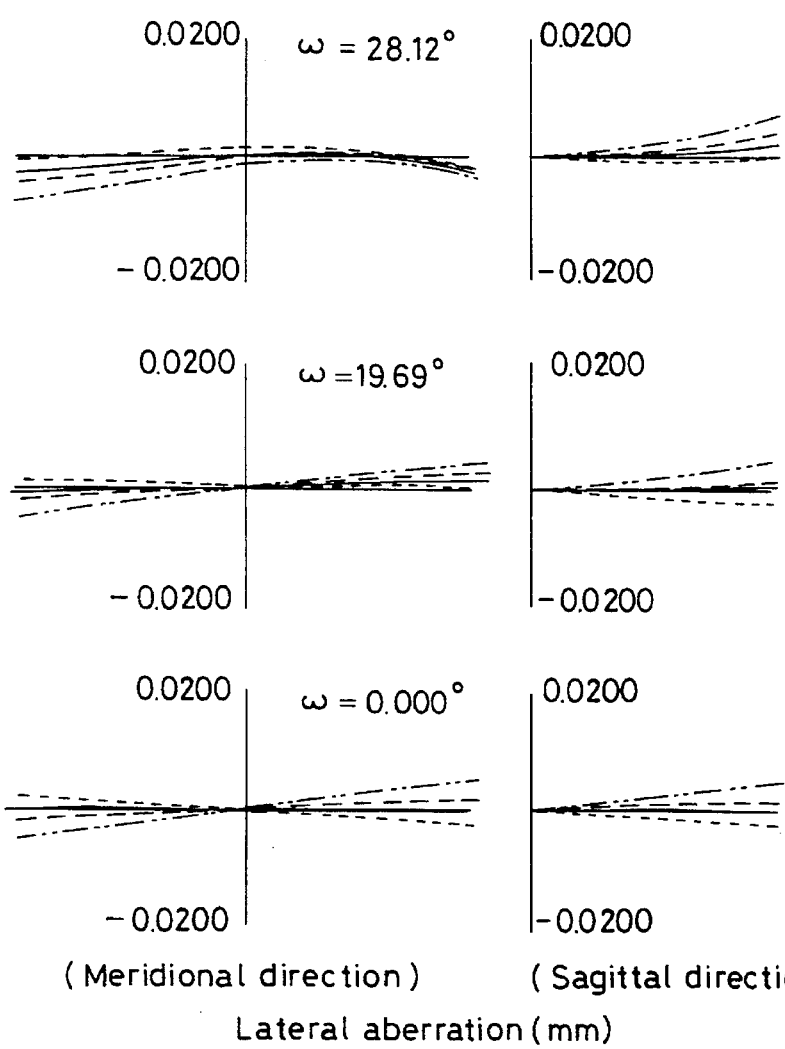
FIG.11(d) Lateral aberration (mm)

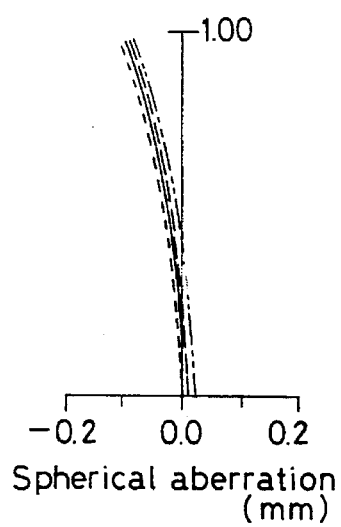
FIG.13(a) Spherical aberration (mm)
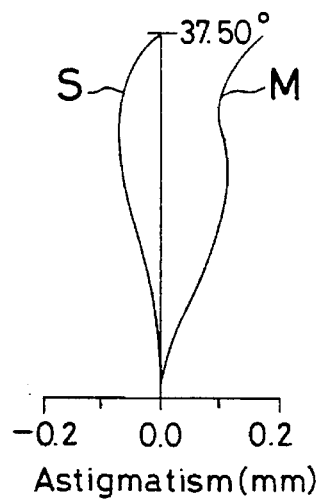
FIG.13(b) Astigmatism (mm)
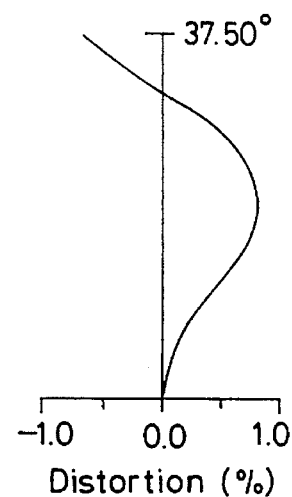
FIG.13(c) Distortion (%)
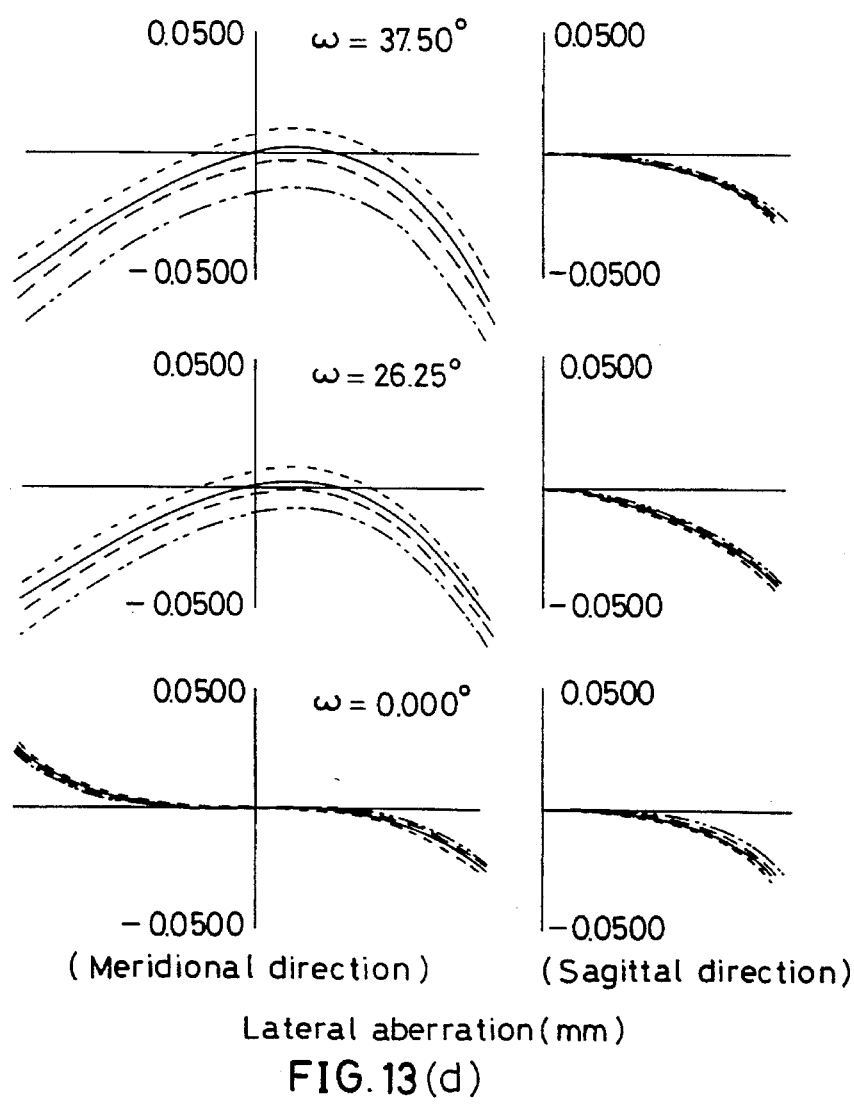
(Meridional direction)  (Sagittal direction)
Lateral aberration (mm)
FIG.13(d)

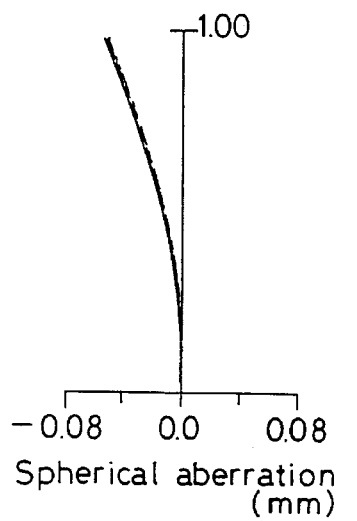
FIG. 15(a) Spherical aberration (mm)
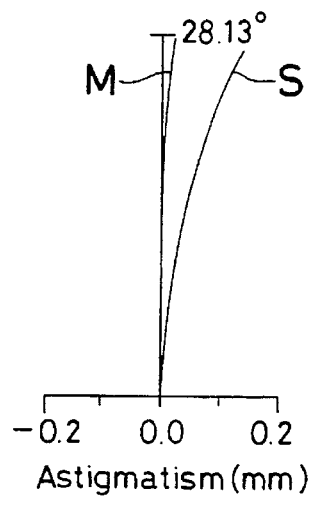
FIG. 15(b) Astigmatism (mm)
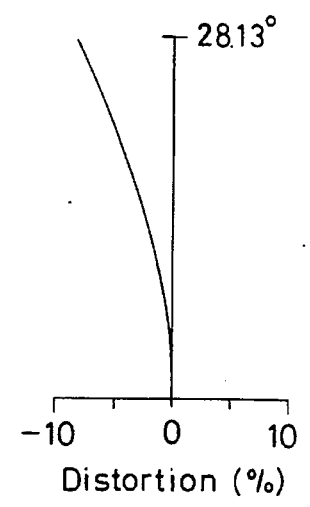
FIG. 15(c) Distortion (%)
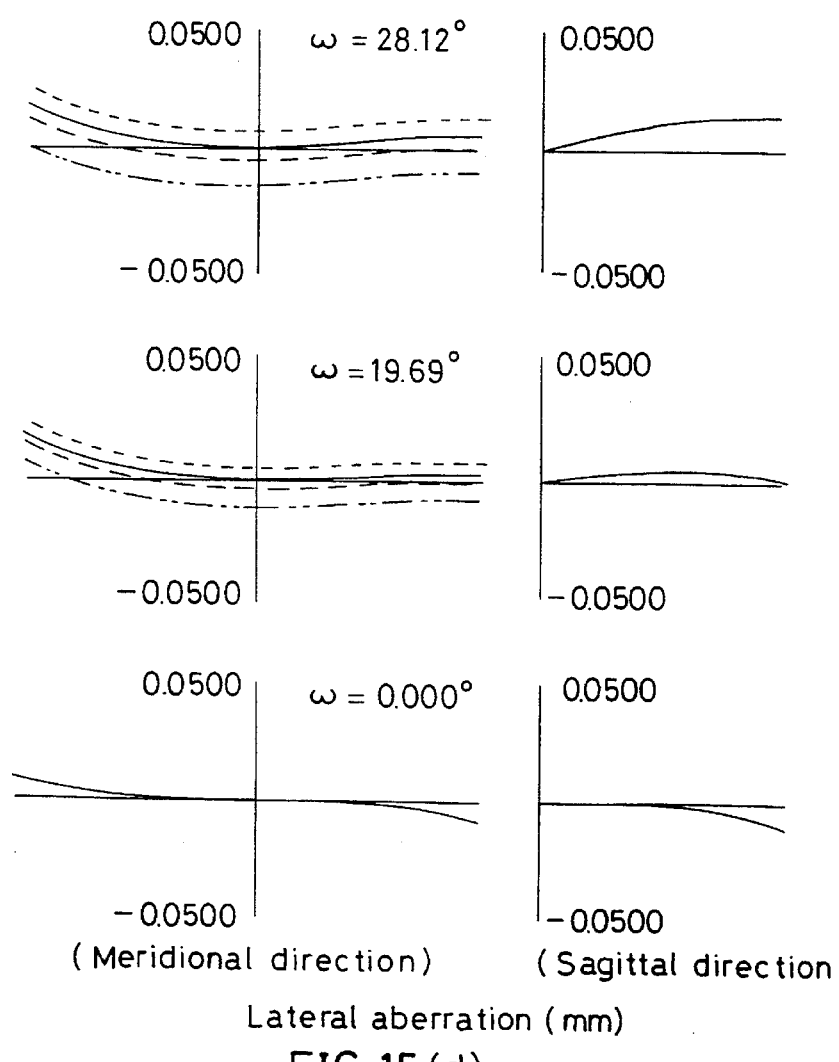
FIG. 15(d) Lateral aberration (mm)

Spherical aberration (mm)

Astigmatism (mm)

Distortion (%)

(Meridional direction)  (Sagittal direction)
Lateral aberration (mm)

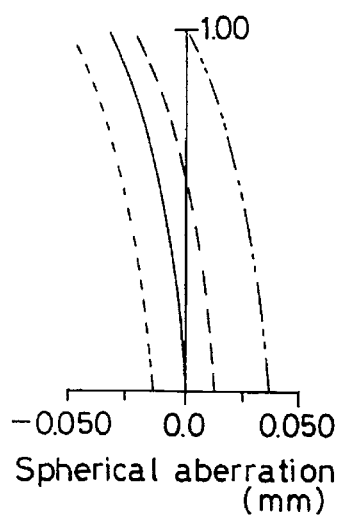
FIG.17(a) Spherical aberration (mm)
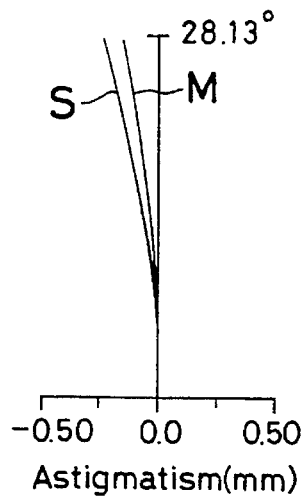
FIG.17(b) Astigmatism(mm)
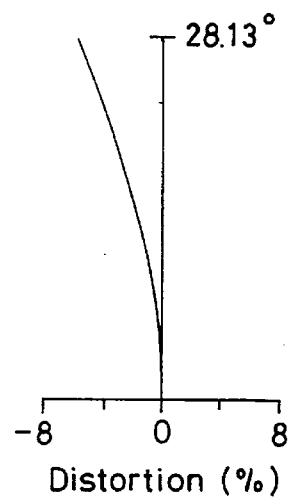
FIG.17(c) Distortion (%)
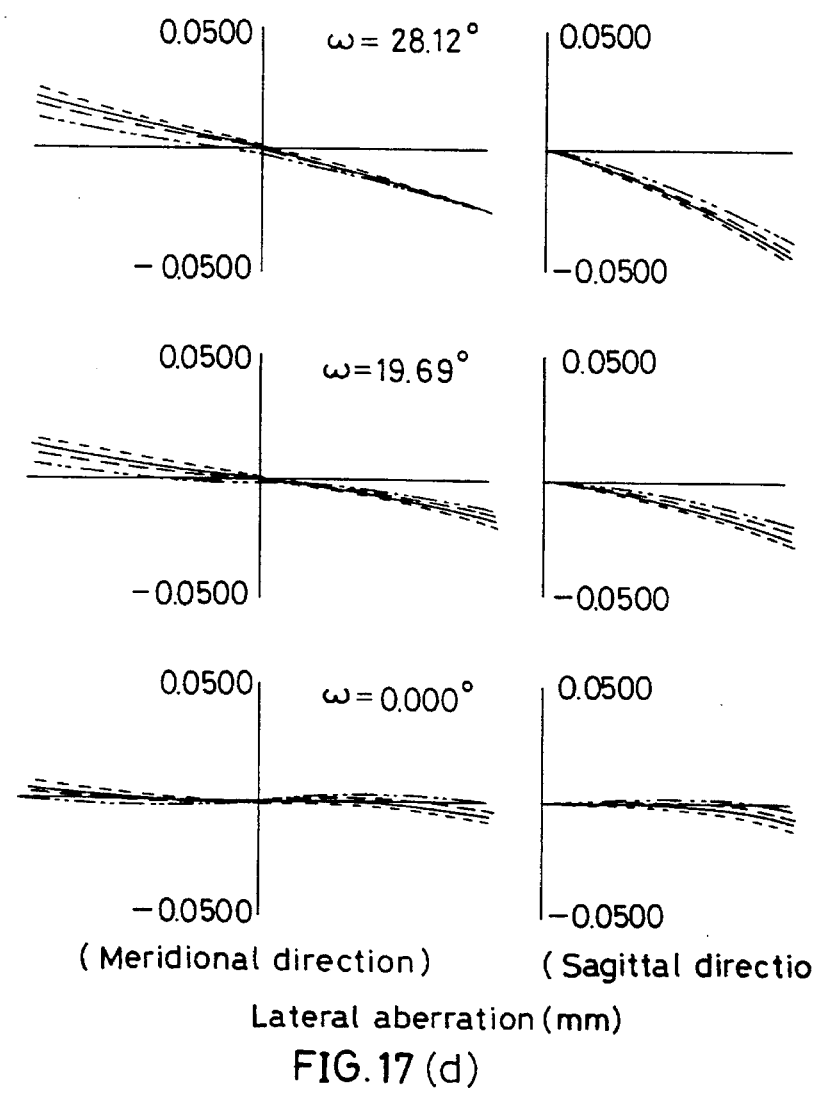
(Meridional direction)   (Sagittal direction)
Lateral aberration (mm)
FIG.17 (d)

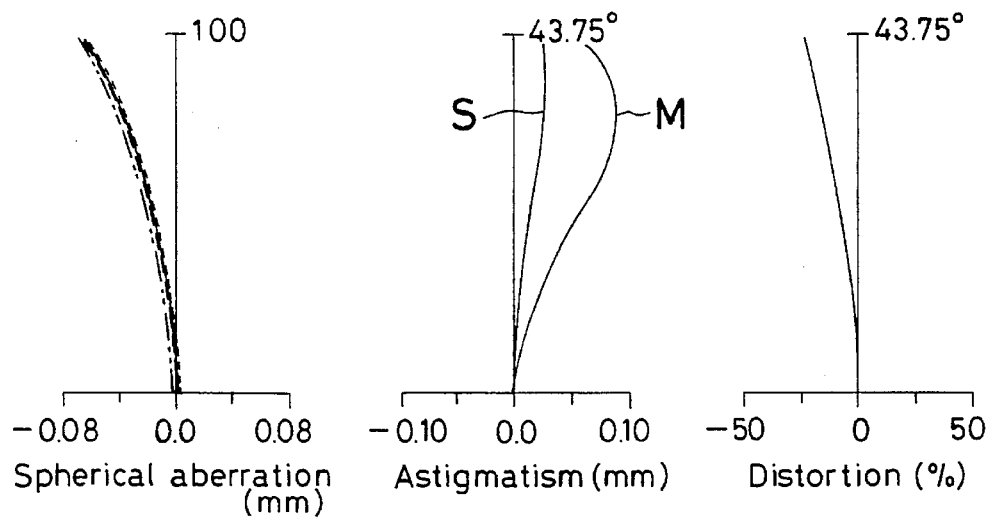
FIG.18(a) Spherical aberration (mm)
FIG.18(b) Astigmatism (mm)
FIG.18(c) Distortion (%)
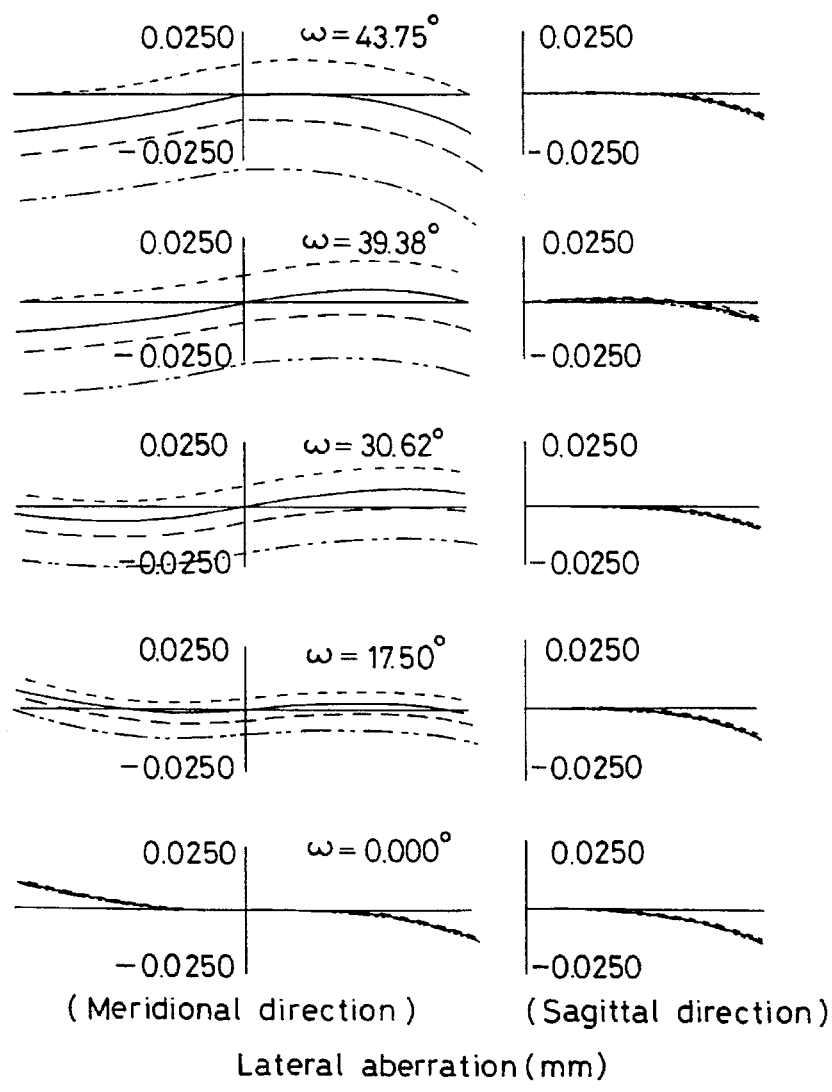
(Meridional direction)  (Sagittal direction)
Lateral aberration (mm)
FIG.18(d)

FIG. 19
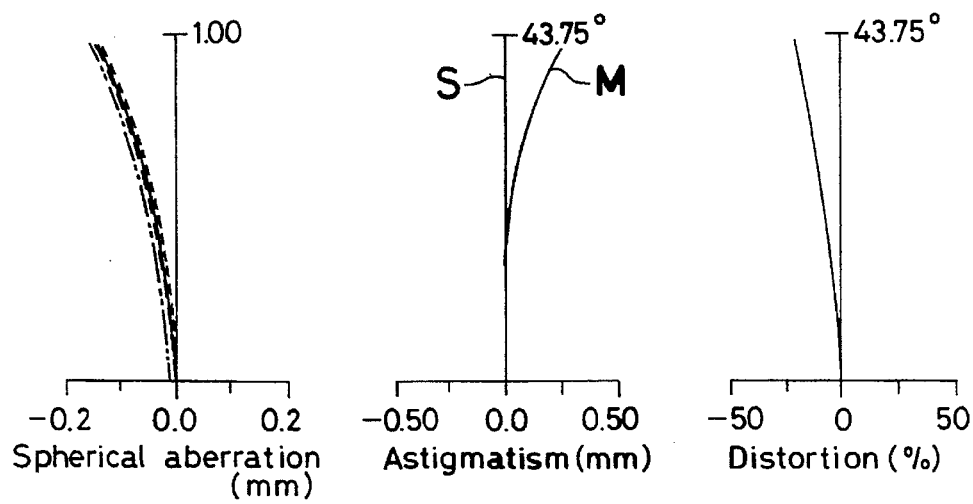
FIG. 19(a) Spherical aberration (mm)
FIG. 19(b) Astigmatism (mm)
FIG. 19(c) Distortion (%)
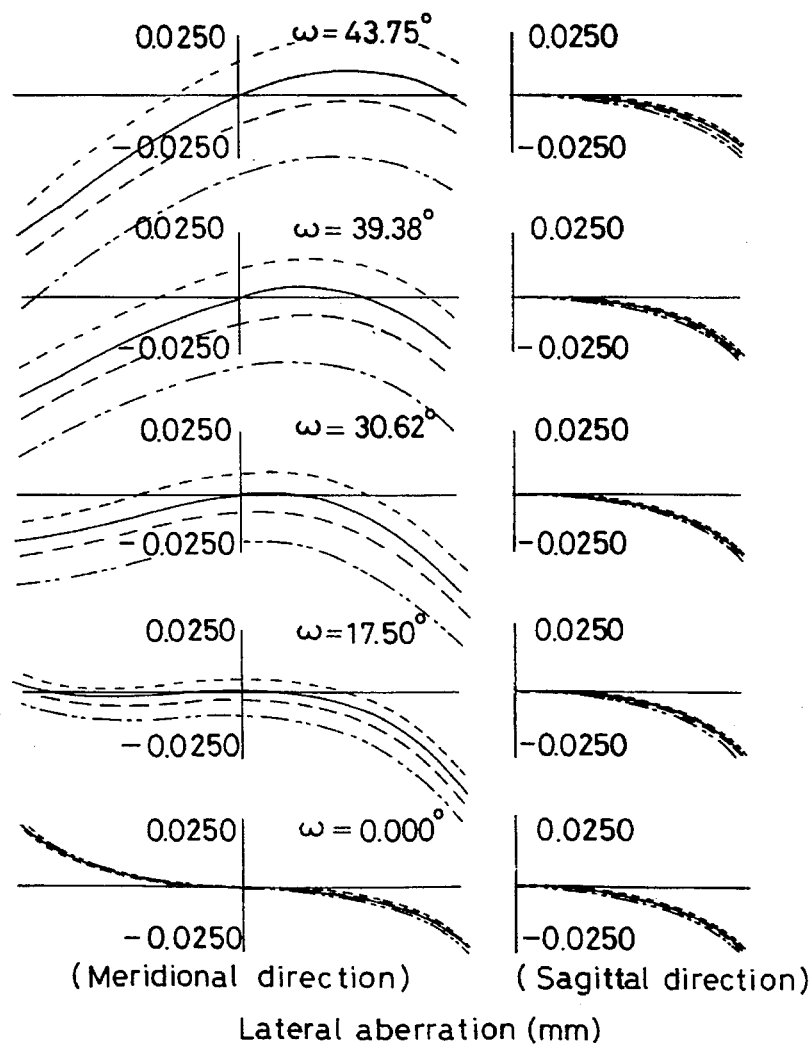
(Meridional direction) (Sagittal direction)
Lateral aberration (mm)
FIG. 19(d)

CONCENTRIC OPTICAL SYSTEM

BACKGROUND OF THE INVENTION

The present invention relates to a concentric optical system which is usable as either an ocular optical system or an imaging optical system. More particularly, the present invention relates to a concentric optical system which has a wide angle of view and high resolution.

In general, a Schmidt system, which is well known as an objective for astronomical telescopes, is arranged as shown in the sectional view of FIG. 23. That is, an aspherical lens LA which is close to a plane-parallel plate is placed at the center of curvature of a concave mirror MC to correct spherical aberration, and a diaphragm D is disposed at the center of curvature to correct coma and astigmatism.

Concentric optical systems, which are represented by the above Schmidt system, are free from coma and astigmatism by virtue of the diaphragm D disposed at the center of curvature of the concave mirror MC. However, since the curvature of field cannot be corrected, a large field curvature occurs. In addition, since the image position lies in front of the concave mirror MC, if a film F or a CCD, for example, is disposed on the image surface, the bundle of incident rays is eclipsed.

It should be noted that U.S. Reissued Pat. No. 27,356 discloses an ocular optical system which, as shown in FIG. 24, uses a semitransparent concave mirror 6 and a semitransparent plane mirror 16 to project an object surface 62 in a distance, and which adopts an arrangement wherein the field curvature produced by the semitransparent concave mirror 6 is corrected by curving the object surface 62. It should be noted that reference numeral 66 in FIG. 24 denotes an exit pupil.

To solve the above-described problems, one type of conventional concentric optical system uses a convex mirror MV, as shown in the sectional view of FIG. 25(a) or 25(b). In this type of concentric optical system, the image surface can be placed behind the concave mirror MC by the convex mirror MV.

However, these conventional concentric optical systems are designed for telescopes or reflecting telephoto lenses, and most of them have a long focal length and a narrow angle of view. There has heretofore been no optical system having a wide angle of view and a small F-number.

Lens systems of wide view angle which are composed of ordinary refracting lenses have the disadvantage that the number of constituent lenses increases and the structure becomes complicated.

SUMMARY OF THE INVENTION

In view of the above-described problems of the related art, it is an object of the present invention to provide a concentric optical system usable as either an imaging optical system or an ocular optical system, which has an F-number of 1.5 to 3 and enables a flat and clear image to be photographed or observed at a view angle of up to 60° or more with substantially no aberration.

To attain the above-described object, the present invention provides a concentric optical system including at least two semitransparent reflecting surfaces each having a center of curvature disposed in the vicinity of a pupil and a concave surface directed toward the pupil. The semitransparent reflecting surfaces are disposed so that each semitransparent reflecting surface passes each particular bundle of light rays at least once and reflects them at least once.

In this case, it is preferable to dispose a device which is composed of polarizing optical elements so as to cut off light rays passing through the at least two semitransparent reflecting surfaces without being reflected by either of them.

To provide the above-described concentric optical system in an ocular optical system, the concentric optical system is preferably arranged such that the centers of curvature of the at least two semitransparent reflecting surfaces are disposed in the vicinity of an eye point with the concave surfaces directed toward the observer side.

To provide the above-described concentric optical system in an imaging optical system, the concentric optical system is preferably arranged such that the centers of curvature of the at least two semitransparent reflecting surfaces are disposed in the vicinity of an aperture diaphragm with the concave surfaces directed toward the object side.

Further, it is preferable to satisfy the following condition:

$$0.5 < |R_1/R_2| < 1.8 \qquad (2)$$

where $R_1$ is the radius of curvature of the semitransparent reflecting surface closer to the pupil, and $R_2$ is the radius of curvature of the other semitransparent reflecting surface.

Alternatively, it is preferable to satisfy the following condition:

$$0.4 < |(D_1+D_2)/R_2| < 1.7 \qquad (3)$$

where $R_2$ is the radius of curvature of the semitransparent reflecting surface remoter from the pupil; $D_1$ is the distance from the pupil to the semitransparent reflecting surface closer to the pupil; and $D_2$ is the distance from the semitransparent reflecting surface closer to the pupil to the other semitransparent reflecting surface.

Alternatively, it is preferable to satisfy the following condition:

$$1 < |(|R_1|+D_2)/R_2| < 1.8 \qquad (4)$$

where $R_1$ is the radius of curvature of the semitransparent reflecting surface closer to the pupil; $R_2$ is the radius of curvature of the other semitransparent reflecting surface; and $D_2$ is the distance from the semitransparent reflecting surface closer to the pupil to the other semitransparent reflecting surface.

Alternatively, it is preferable to satisfy the following condition:

$$|D_1/R_1| < 1.5 \qquad (5)$$

where $R_1$ is the radius of curvature of the semitransparent reflecting surface closer to the pupil, and $D_1$ is the distance from the pupil to the semitransparent reflecting surface closer to the pupil.

In addition, the present invention provides a concentric optical system including a first semitransparent reflecting surface having a center of curvature disposed substantially on an optical axis and a concave surface directed toward the center of curvature, and a second semitransparent reflecting surface having a center of curvature disposed at approximately the same position as the center of curvature of the first semitransparent reflecting surface.

In addition, the present invention provides a concentric optical system including a pair of first and second semitransparent reflecting surfaces having respective centers of curvature disposed at approximately the same position. The first and second semitransparent reflecting surfaces are arranged so that a bundle of light rays passing through the first semitransparent reflecting surface is reflected by the second semitransparent reflecting surface, and the bundle of light rays reflected by the second semitransparent reflecting surface is reflected by the first semitransparent reflecting surface and then passes through the second semitransparent reflecting surface.

The reason for adopting the above-described arrangements in the present invention and the functions thereof will be explained below.

The present invention, which has been made to solve the above-described problems of the related art, is a concentric optical system including at least two semitransparent reflecting surfaces each having a center of curvature disposed in the vicinity of a pupil and a concave surface directed toward the pupil. The semitransparent reflecting surfaces are disposed so that each semitransparent reflecting surface passes each particular bundle of light rays at least once and reflects them at least once.

The concentric optical system of the present invention will be explained below as an imaging optical system for the sake of convenience. However, it is easy to use the concentric optical system as an ocular optical system by modifying the arrangement such that the image surface in the optical system of the present invention formed as an imaging optical system is replaced by an object point. Thus, it will be clear that the present invention has constituent features required to form an ocular optical system. That is, the concentric optical system of the present invention can also function as an ocular optical system by inverting the arrangement of the imaging optical system described below.

FIG. 1 is a view used to explain the basic arrangement of the concentric optical system according to the present invention and the reason why the amount of aberration occurring in the concentric optical system is small. In FIG. 1, reference numeral 1 denotes a pupil position, 2 a first semitransparent reflecting surface, 3 a second semitransparent reflecting surface, and 4 an image surface. FIG. 1 illustrates an optical ray trace of an arrangement in which the center of curvature of the first surface 2 and that of the second surface 3 are perfectly coincident with the pupil position 1. It will be understood from the figure that since the pupil position 1 and the centers of curvature of the first and second surfaces 2 and 3 are coincident with each other, axial rays and off-axis rays are rotationally symmetric with respect to the pupil position 1. This means that neither astigmatism nor coma, which are off-axis aberrations, occurs. In addition, since all the surfaces that have refracting power are reflecting surfaces, no chromatic aberration occurs either in theory. In a case where the F-number is 2 or less, the occurrence of spherical aberration can also be virtually ignored.

However, the image surface formed by the second surface 3 is a spherical surface centered at the pupil position 1. Therefore, field curvature can occur. The present invention has succeeded in effectively correcting the field curvature in the concentric optical system, in which the amount of aberration produced is exceedingly small, as has been described above. The scheme of correcting the field curvature according to the present invention will be explained below.

Although the concentric optical system of U.S. Reissued Pat. No. 27,356, shown in FIG. 24, is used as an ocular optical system, it will be explained as an imaging optical system in the following description of the present invention for the sake of convenience, by changing the denotation such that reference numeral 66 denotes a pupil plane, and 62 an image surface. In the optical system shown in FIG. 24, the field curvature produced by the concave mirror 6 is corrected by curving the image surface 62. In general, however, a curved image surface is not suitable for an arrangement in which a film or an imaging device, e.g., CCD, is disposed. Therefore, in the present invention, the concentric optical system is arranged such that the field curvature produced by the concave mirror 3 is corrected by the convex mirror 2, as shown in FIG. 1.

That is, Petzval sum PS, which is generally regarded as indicating an amount of field curvature produced, is expressed by $$PS = \Sigma(1/n \cdot f) \quad (1)$$

where n is the refractive index, and f is the focal length of the surface.

In the case of the optical system of U.S. Reissued Pat. No. 27,356, which is equivalent to an arrangement in which the convex mirror 2 in the present invention is replaced by the plane mirror 16, Petzval sum occurring when rays are reflected by the concave mirror 6 is not corrected at all because the focal length of the plane mirror 16 is infinity.

Therefore, in the present invention, the convex mirror 2 is used in place of the plane mirror 16, thereby enabling the Petzval sum produced by the concave mirror 3 to be corrected by the convex mirror 2.

In optical systems represented by the reflecting telephoto lenses as shown in FIGS. 25(a) and 25(b), an opening must be provided in the center of the concave mirror MC as an opening for taking out a bundle of rays. In order to minimize the vignetting of light rays near the edges of visual field that occurs at the opening of the concave mirror MC, the pupil plane must be disposed in the vicinity of the opening of the concave mirror MC. With this arrangement, however, the angle of view is limited by the opening of the concave mirror MC and the aperture of the convex mirror MV, and it is only possible to obtain a view angle of several degrees.

To solve the above problem also, the pupil plane 1 must not be present in the vicinity of the concave mirror 3 or the convex mirror 2 or at a position closer to the image side than the concave mirror 3. In other words, it is essential to dispose the pupil plane 1 at a position closer to the center of curvature of the concave mirror 3.

Further, it is preferable to satisfy the following conditions in order to carry out favorable aberration correction. The following conditional expressions correspond to various aberrations, respectively, and they are independent of each other under actual use conditions, e.g., the angle of view, F-number, etc; there is no correlation between the conditional expressions. It may be necessary to satisfy all the conditions, depending upon the use conditions.

First, the relationship between the first and second surfaces 2 and 3 will be explained. Correction of the Petzval sum is particularly important in order to realize favorable aberration correction, as has been described above. In the present invention, it is essential in order to correct the Petzval sum to satisfy the following condition:

$$0.5 < |R_1/R_2| < 1.8 \quad (2)$$

where $R_1$ is the radius of curvature of the first surface 2, and $R_2$ is the radius of curvature of the second surface 3.

The condition (2) specifies the power distribution to the positive second surface 3 and the negative first surface 2. If $|R_1/R_2|$ is not larger than the lower limit, i.e., 0.5, the balance of aberrations, mainly Petzval sum, corrected by the first and second surfaces 2 and 3 is destroyed, and a large negative Petzval sum is produced. If $|R_1/R_2|$ is not smaller than the upper limit, i.e., 1.8, a large positive Petzval sum is produced, so that it becomes impossible to correct the Petzval sum by another surface.

In a case where it is necessary to comply with the demand for high-definition images as represented by those in high-vision TV in recent years, the Petzval sum must be corrected even more effectively, and it is essential to satisfy the following condition:

$$0.7<|R_1/R_2|<1.7 \qquad (6)$$

Next, the second semitransparent reflecting surface 3 will be explained. Assuming that the distance from the pupil plane 1 to the first surface 2 is $D_1$, and the surface separation between the first and second surfaces 2 and 3 is $D_2$, it is preferable to satisfy the following condition:

$$0.4<|(D_1+D_2)/r_2|<1.7 \qquad (3)$$

If $|(D_1+D_2)/r_2|$ is not larger than the lower limit, i.e., 0.4, the inclination of the chief ray of emergent light passing through the second surface 3 becomes excessively large, and large negative astigmatism and coma occur. If $|(D_1+D_2)/r_2|$ is not smaller than the upper limit, i.e., 1.7, the amount of negative astigmatism and coma decreases. Consequently, the positive astigmatism and coma produced in the entire lens system undesirably increase because the negative astigmatism and coma are produced to cancel the positive astigmatism and coma produced when the rays pass through the first surface 2.

Further, it is essential in the present invention that the second surface 3 be concentric. Assuming that the radius of curvature of the first surface 2 is $R_1$, the radius of curvature of the second surface 3 is $R_2$, and the surface separation between the first and second surfaces 2 and 3 is $D_2$, it is essential to satisfy the following condition:

$$1<|(|R_1|+D_2)/R_2|<1.8 \qquad (4)$$

The condition (4) must be satisfied in order to enable the coma and astigmatism produced by the second surface 3 to be corrected by the entire system. If $|(|R_1|+D_2)/R_2|$ is not larger than the lower limit, i.e., 1, the system becomes close to a perfect concentric optical system, so that it becomes impossible to correct the Petzval sum. As a result, a larger field curvature occurs. If $|(|R_1|+D_2)/R_2|$ is not smaller than the upper limit, i.e., 1.8, the angle of incidence of the chief ray on the second surface 3 becomes large, causing the positive comatic aberration to increase. In either case, it becomes impossible to form an image which is clear as far as the edges of visual field.

Further, it is preferable to satisfy the following condition:

$$|D_1/R_1|<1.5 \qquad (5)$$

where $D_1$ is the distance from the pupil plane 1 to the first surface 2, and $R_1$ is the radius of curvature of the first surface 2.

If $|D_1/R|$ is not smaller than the upper limit, i.e., 1.5, the height of the chief ray incident on the first surface 2 undesirably increases, resulting in an increase in the amount of positive coma and astigmatism produced. Consequently, it becomes impossible to form an image which is clear as far as the edges of visual field.

Next, the surface separation will be explained. Assuming that the surface separation between the pupil plane 1 and the first surface 2 is $D_1$, and the focal length of the entire system is F, it is essential to satisfy the following condition:

$$D_1/F<1.6 \qquad (7)$$

The condition (7) must be satisfied in order to minimize the comatic aberration produced by the first surface 2. If $D_1/F$ is not smaller than the upper limit, i.e., 1.6, the comatic aberration produced by the first surface 2 becomes large, so that it becomes impossible to correct it by another surface. In a case where the optical system of the present invention is used as an ocular optical system, it is essential to satisfy the following condition:

$$0.5<D_1/F \qquad (8)$$

In the case of an ocular optical system, the condition (8) is concerned with the eye point of an ocular lens. If $D_1/F$ is not larger than the lower limit, i.e., 0.5, the observer's pupil position and the exit pupil position 1 of the ocular optical system are displaced from each other, and it becomes impossible to observe the entire field of view.

Assuming that the surface separation between the first and second surfaces 2 and 3 is $D_2$, it is essential to satisfy the following condition:

$$0.2<D_2/F<0.7 \qquad (9)$$

The condition (9) must be satisfied in order to obtain a balance of the Petzval sum produced by the first surface 2 and the Petzval sum produced by the second surface 3. If $D_2/F$ is not smaller than the upper limit, i.e., 0.7, or not larger than the lower limit, i.e., 0.2, the balance of the aberrations produced by the first and second surfaces 2 and 3 is destroyed, resulting in a large difference between the Petzval sums, which should cancel each other substantially.

To cut off flare that passes through the first and second surfaces 2 and 3 and reaches the image surface 4 without being reflected by either of the first and second surfaces 2 and 3, it is essential to use polarizing optical elements as shown in U.S. Reissued Pat. No. 27,356. For example, a first polarizing plate and a first quarter-wave plate are disposed at the side of the first surface 2 which is closer to the pupil plane 1 to circularly polarize the incident light. In addition, a second quarter-wave plate is disposed between the first and second semitransparent reflecting surfaces 2 and 3, and a second polarizing plate is disposed in parallel Nicol relation to the first polarizing plate behind the second semitransparent reflecting surface 3. With this arrangement, normal rays which are reflected once by each of the first and second surfaces 2 and 3 pass through the second quarter-wave plate, which is disposed between the first and second surfaces 2 and 3, three times. Thus, the normal rays pass through the first and second quarter-wave plates four times in total. Accordingly, the light passing through the first polarizing plate passes through the second polarizing plate, which is disposed in parallel Nicol relation to the first polarizing plate, without the plane of polarization being rotated. However, rays that pass through the first semitransparent reflecting surface 2 without being reflected pass through the quarter-wave plates only twice in total; therefore, the plane of polarization is rotated through 90°, and these rays are cut off by the second polarizing plate.

Thus, flare can be cut off by using polarizing optical elements as described above. It should be noted that it is also possible to employ a polarizing optical element arrangement other than that described above, and that the above-described arrangement is merely an example.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 11(a) to 11(d) graphically show spherical aberration, astigmatism, distortion and lateral aberration in the first embodiment.

FIGS. 13(a) to 13(d) graphically show various aberrations in the third embodiment in the same way as in FIGS. 11(a) to 11(d).

FIGS. 15(a) to 15(d) graphically show various aberrations in the fifth embodiment in the same way as in FIGS. 11(a) to 11(d).

FIGS. 17(a) to 17(d) graphically show various aberrations in the seventh embodiment in the same way as in FIGS. 11(a) to 11(d).

FIGS. 18(a) to 18(d) graphically show various aberrations in the eighth embodiment in the same way as in FIGS. 11(a) to 11(d).

DESCRIPTION OF THE PREFERRED EMBODIMENTS

First to ninth embodiments of the concentric optical system according to the present invention will be described below with reference to the accompanying drawings.

Figure 1:
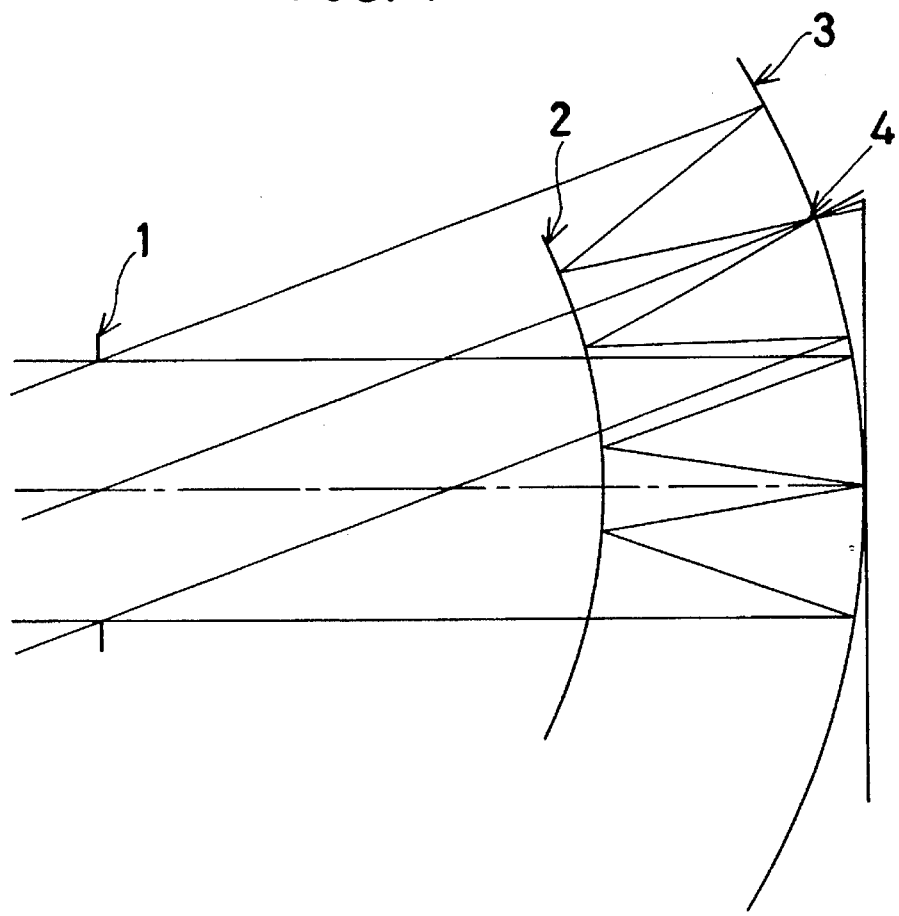
FIG. 1 is a view used to explain the basic arrangement of the concentric optical system according to the present invention and the reason why the amount of aberration occurring in the concentric optical system is small.
Figure 2:
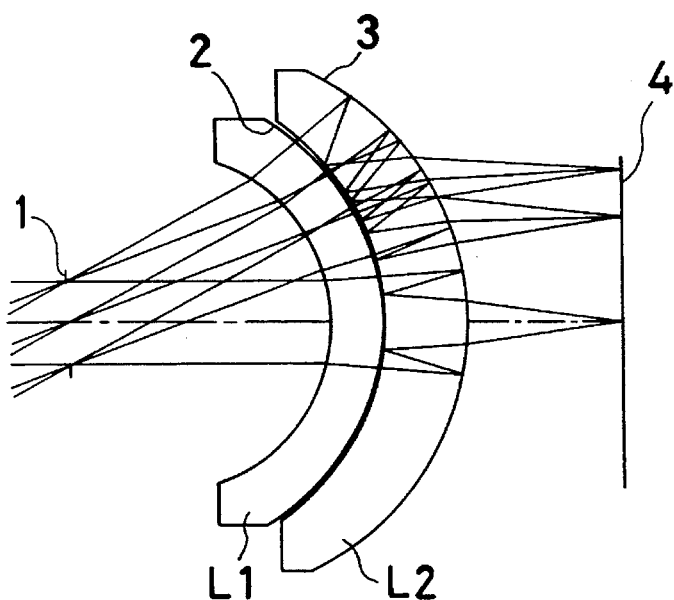
FIG. 2 is a sectional view of a first embodiment of the concentric optical system according to the present invention.

First Embodiment:

A first embodiment of the present invention will be explained below with reference to FIG. 2. In the figure, reference numeral 1 denotes a stop position, 2 a first semitransparent reflecting surface, 3 a second semitransparent reflecting surface, and 4 an image surface. In this embodiment, two meniscus lenses L1 and L2 are employed. The convex surface of the meniscus lens L1 is used as the first semitransparent reflecting surface 2, and the convex surface of the meniscus lens L2 is used as the second semitransparent reflecting surface 3. Examples of numerical values in this embodiment are shown below. In the following numerical data, nd denotes the refractive index of lens, and νd denotes the Abbe's number (the same shall apply hereinafter).

In this embodiment, the angle of view is 45°, the focal length F is 10 mm, and F-number is 3.5.

| Surface No. | Curvature radius | Surface separation | nd | νd |
|---|---|---|---|---|
| 1 | pupil position 1 | 9.158 | | |
| 2 | −5.5382 | 1.624 | 1.5163 | 64.1 |
| 3 | −7.7395 | 0.071 | | |
| 4 | −7.8437 | 2.777 | 1.5163 | 64.1 |
| 5 | −9.1995 (reflecting surface 3) | −2.777 | 1.5163 | 64.1 |
| 6 | −7.8437 | −0.071 | | |
| 7 | −7.7395 (reflecting surface 2) | 0.071 | | |
| 8 | −7.8437 | 2.777 | 1.5163 | 64.1 |
| 9 | −9.1995 | 5.141 | | |
| 10 | image surface 4 | | | |

FIGS. 11(a), 11(b), 11(c) and 11(d) graphically show spherical aberration, astigmatism, distortion and lateral aberration, respectively, in this embodiment. FIG. 11(d) illustrates the meridional direction on the left and the sagittal direction on the right.

Figure 3:
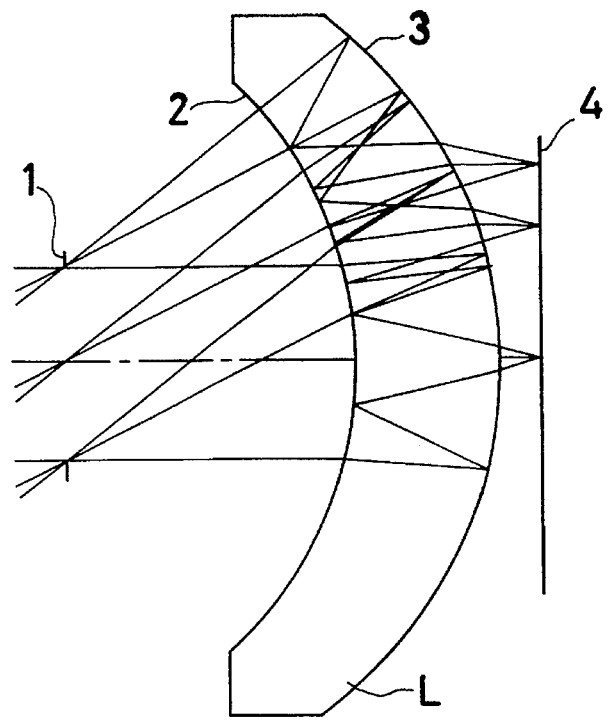
FIG. 3 is a sectional view of a second embodiment of the present invention.

Second Embodiment:

A second embodiment of the present invention will be explained below with reference to FIG. 3. In the figure, reference numeral 1 denotes a stop position, 2 a first semitransparent reflecting surface, 3 a second semitransparent reflecting surface, and 4 an image surface. In this embodiment, one meniscus lens L is employed, and the concave surface thereof is used as the first semitransparent reflecting surface 2, while the convex surface thereof is used as the second semitransparent reflecting surface 3. Examples of numerical values are shown below. In this embodiment, the angle of view is 60°, the focal length F is 10 mm, and F-number is 1.5.

| Surface No. | Curvature radius | Surface separation | nd | vd |
|---|---|---|---|---|
| 1 | pupil position 1 | 10.130 | | |
| 2 | −13.6165 | 5.239 | 1.5163 | 64.1 |
| 3 | −14.6357 (reflecting surface 3) | −5.239 | 1.5163 | 64.1 |
| 4 | −13.6165 (reflecting surface 2) | 5.239 | 1.5163 | 64.1 |
| 5 | −14.6357 | 1.216 | | |
| 6 | image surface 4 | | | |

FIGS. 12(a) to 12(d) graphically show various aberrations in this embodiment in the same way as in FIGS. 11(a) to 11(d).

Figure 4:
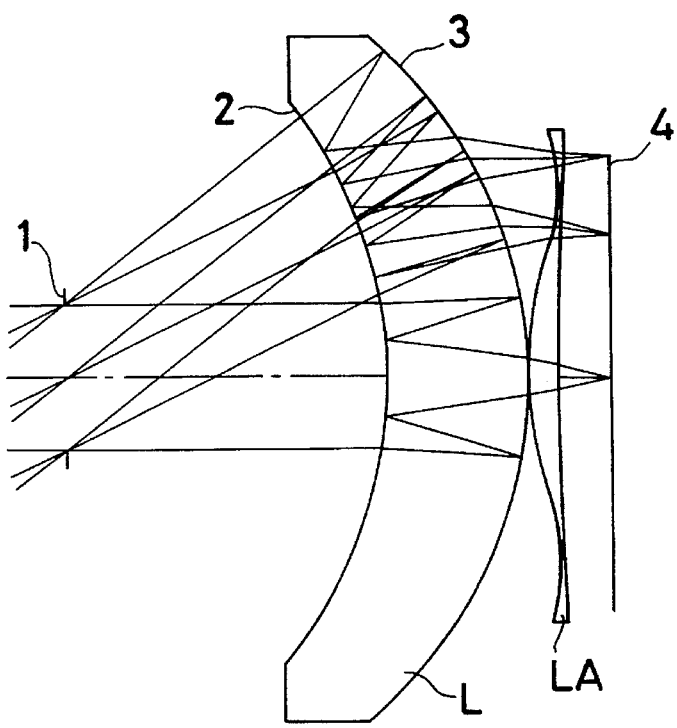
FIG. 4 is a sectional view of a third embodiment of the present invention.

Third Embodiment:

A third embodiment of the present invention will be explained below with reference to FIG. 4. In the figure, reference numeral 1 denotes a stop position, 2 a first semitransparent reflecting surface, 3 a second semitransparent reflecting surface, and 4 an image surface. In this embodiment, one meniscus lens L is employed, and the concave surface thereof is used as the first semitransparent reflecting surface 2, while the convex surface thereof is used as the second semitransparent reflecting surface 3. In addition, an aspherical lens LA for image distortion correction is disposed at the side of the meniscus lens L which is closer to the image surface 4. Examples of numerical values are shown below. In this embodiment, the angle of view is 60°, the focal length F is 10 mm, and F-number is 2.0.

| Surface No. | Curvature radius | Surface separation | nd | vd |
|---|---|---|---|---|
| 1 | pupil position 1 | 11.423 | | |
| 2 | −14.4225 | 4.817 | 1.5163 | 64.1 |
| 3 | −14.9832 (reflecting surface 3) | −4.817 | 1.5163 | 64.1 |
| 4 | −14.4225 (reflecting surface 2) | 4.817 | 1.5163 | 64.1 |
| 5 | −14.9832 | 0.046 | | |
| 6 | 12.5539 (aspherical surface) K = 0 B = −0.213608 × $10^{-5}$ | 0.914 A = −0.352385 × $10^{-3}$ C = 0 | 1.5163 | 64.1 |
| 7 | 110.7802 | 1.857 | | |
| 8 | image surface 4 | | | |

The above-described aspherical surface is a rotationally symmetric surface expressed by $$Z=(Y^2/R)/[1+\{1-(1+K)(Y/R)^2\}^{1/2}]+AY^4+BY^6+CY^8$$

where R is the paraxial curvature radius; K is a conical constant; and A, B and C are aspherical coefficients.

In the above expression, the direction of propagation of light along the optical axis is taken as Z-axis, and a direction perpendicularly intersecting the optical axis is taken as Y-axis.

FIGS. 13(a) to 13(d) graphically show various aberrations in this embodiment in the same way as in FIGS. 11(a) to 11(d).

Figure 5:
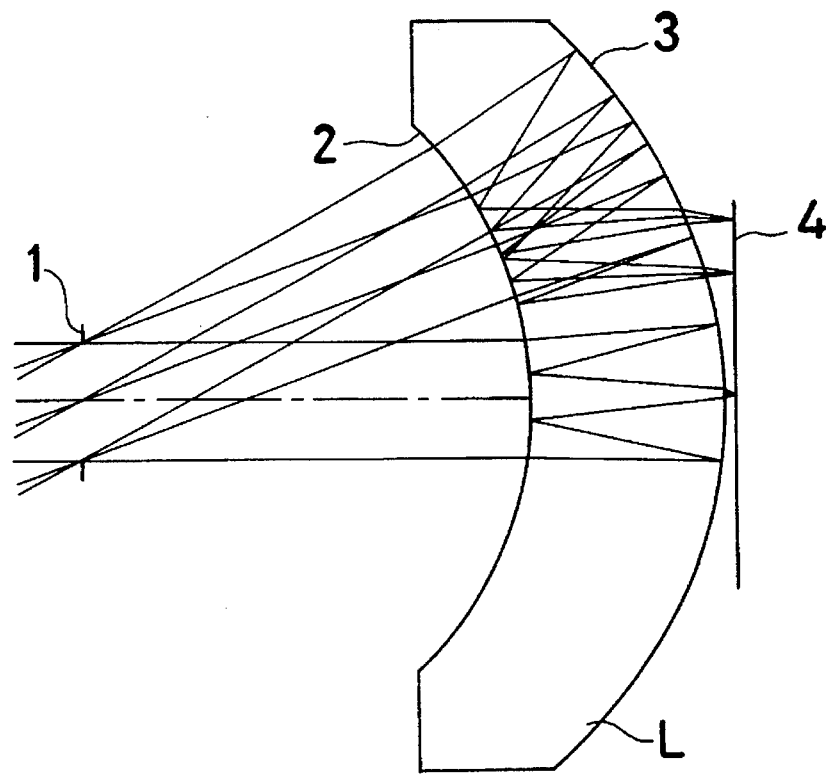
FIG. 5 is a sectional view of a fourth embodiment of the present invention.

Fourth Embodiment:

A fourth embodiment of the present invention will be explained below with reference to FIG. 5. This embodiment is similar to the second embodiment. Examples of numerical values are shown below. In this embodiment, the angle of view is 45°, the focal length F is 10 mm, and F-number is 3.0.

| Surface No. | Curvature radius | Surface separation | nd | vd |
|---|---|---|---|---|
| 1 | pupil position 1 | 13.127 | | |
| 2 | −11.2445 | 5.633 | 1.5163 | 64.1 |
| 3 | −14.0354 (reflecting surface 3) | −5.633 | 1.5163 | 64.1 |
| 4 | −11.2445 (reflecting surface 2) | 5.633 | 1.5163 | 64.1 |
| 5 | −14.0354 | 0.348 | | |
| 6 | image surface 4 | | | |

FIGS. 14(a) to 14(d) graphically show various aberrations in this embodiment in the same way as in FIGS. 11(a) to 11(d).

Figure 6:
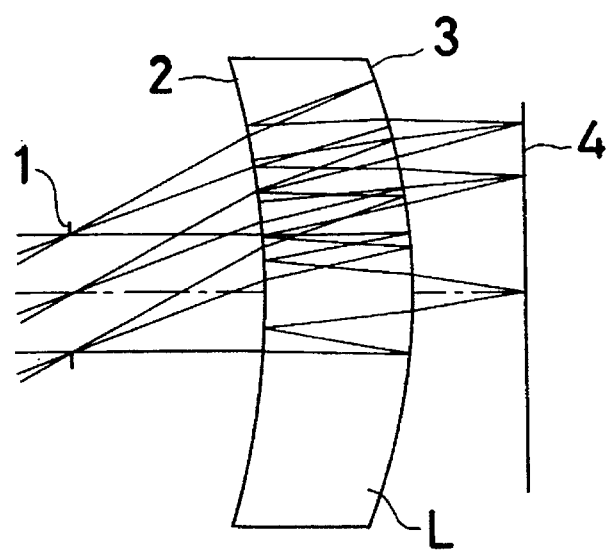
FIG. 6 is a sectional view of a fifth embodiment of the present invention.

Fifth Embodiment:

A fifth embodiment of the present invention will be explained below with reference to FIG. 6. This embodiment is also similar to the second embodiment. Examples of numerical values are shown below. In this embodiment, the angle of view is 45°, the focal length F is 10 mm, and F-number is 3.0.

| Surface No. | Curvature radius | Surface separation | nd | vd |
|---|---|---|---|---|
| 1 | pupil position 1 | 5.805 | | |
| 2 | −24.3790 (reflecting surface 3) | 4.437 | 1.5163 | 64.1 |
| 3 | −17.4632 (reflecting surface 2) | −4.437 | 1.5163 | 64.1 |
| 4 | −24.3790 | 4.437 | 1.5163 | 64.1 |
| 5 | −17.4632 | 3.193 | | |
| 6 | image surface 4 | | | |

FIGS. 15(a) to 15(d) graphically show various aberrations in this embodiment in the same way as in FIGS. 11(a) to 11(d).

Figure 7:
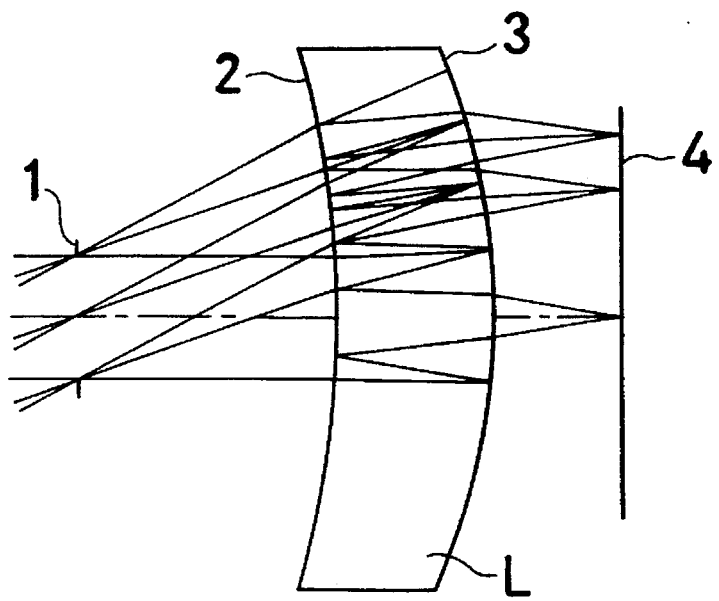
FIG. 7 is a sectional view of a sixth embodiment of the present invention.

Sixth Embodiment:

A sixth embodiment of the present invention will be explained below with reference to FIG. 7. This embodiment is also similar to the second embodiment. Examples of numerical values are shown below. In this embodiment, the angle of view is 45°, the focal length F is 10 mm, and F-number is 3.0.

| Surface No. | Curvature radius | Surface separation | nd | vd |
|---|---|---|---|---|
| 1 | pupil position 1 | 7.259 | | |
| 2 | −27.0911 | 4.287 | 1.5163 | 64.1 |
| 3 | −18.0607 (reflecting surface 3) | −4.287 | 1.5163 | 64.1 |
| 4 | −27.0911 (reflecting surface 2) | 4.287 | 1.5163 | 64.1 |
| 5 | −18.0607 | 3.534 | | |
| 6 | image surface 4 | | | |

FIGS. 16(a) to 16(d) graphically show various aberrations in this embodiment in the same way as in FIGS. 11(a) to 11(d).

Figure 8:
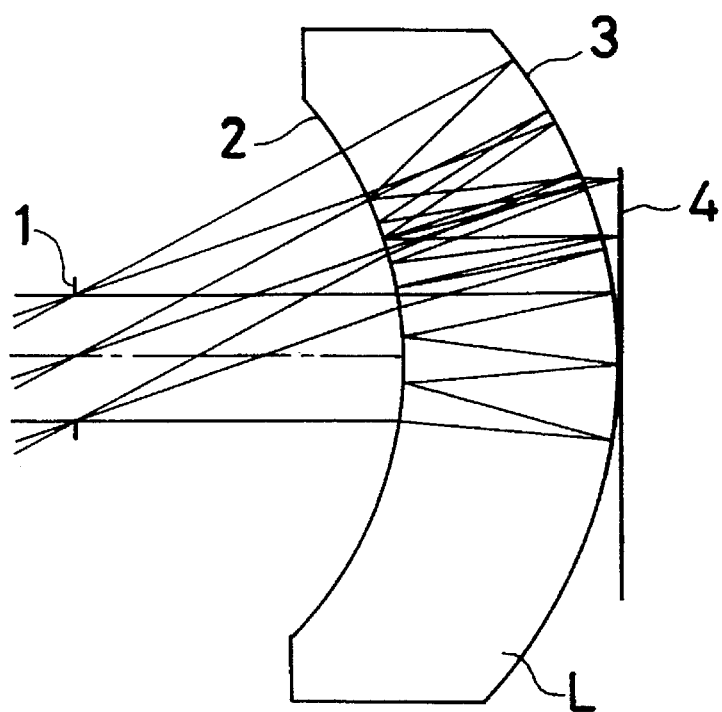
FIG. 8 is a sectional view of a seventh embodiment of the present invention.

Seventh Embodiment:

A seventh embodiment of the present invention will be explained below with reference to FIG. 8. This embodiment is also similar to the second embodiment. Examples of numerical values are shown below. In this embodiment, the angle of view is 45°, the focal length F is 10 mm, and F-number is 3.0.

| Surface No. | Curvature radius | Surface separation | nd | vd |
|---|---|---|---|---|
| 1 | pupil position 1 | 9.152 | | |
| 2 | −10.2521 | 5.711 | 1.5163 | 64.1 |
| 3 | −13.6695 (reflecting surface 3) | −5.711 | 1.5163 | 64.1 |
| 4 | −10.2521 (reflecting surface 2) | 5.711 | 1.5163 | 64.1 |
| 5 | −13.6695 | 0.100 | | |
| 6 | image surface 4 | | | |

FIGS. 17(a) to 17(d) graphically show various aberrations in this embodiment in the same way as in FIGS. 11(a) to 11(d).

Figure 9:
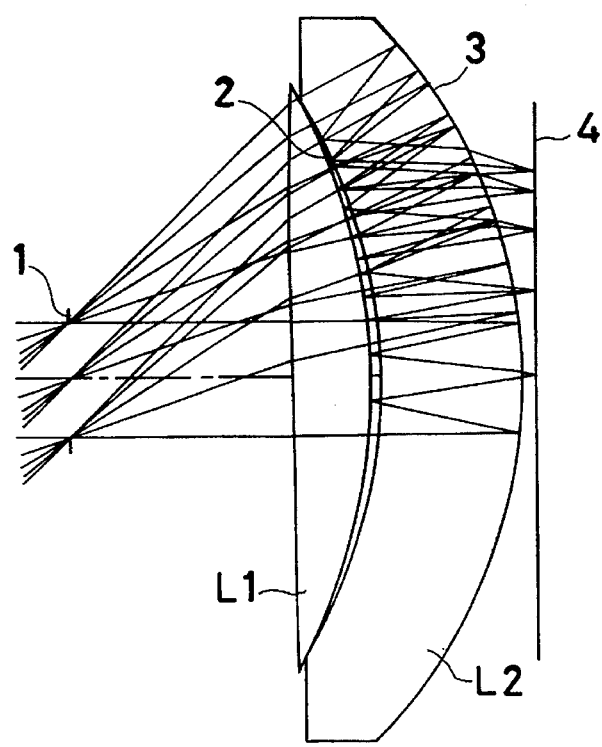
FIG. 9 is a sectional view of an eighth embodiment of the present invention.

Eighth Embodiment:

An eighth embodiment of the present invention will be explained below with reference to FIG. 9. This embodiment is approximately similar to the first embodiment. Examples of numerical values are shown below. In this embodiment, the angle of view is 70°, the focal length F is 10 mm, and F-number is 2.5.

| Surface No. | Curvature radius | Surface separation | nd | vd |
|---|---|---|---|---|
| 1 | pupil position 1 | 8.255 | | |
| 2 | ∞ | 2.813 | 1.5163 | 64.1 |
| 3 | −22.1680 | 0.355 | | |
| 4 | −19.6995 | 5.058 | 1.5163 | 64.1 |
| 5 | −18.7996 (reflecting surface 3) | −5.058 | 1.5163 | 64.1 |
| 6 | −19.6995 | −0.355 | | |
| 7 | −22.1680 (reflecting surface 2) | 0.355 | | |
| 8 | −19.6995 | 5.058 | 1.5163 | 64.1 |
| 9 | −18.7996 | 0.520 | | |
| 10 | image surface 4 | | | |

FIGS. 18(a) to 18(d) graphically show various aberrations in this embodiment in the same way as in FIGS. 11(a) to 11(d).

Figure 10:
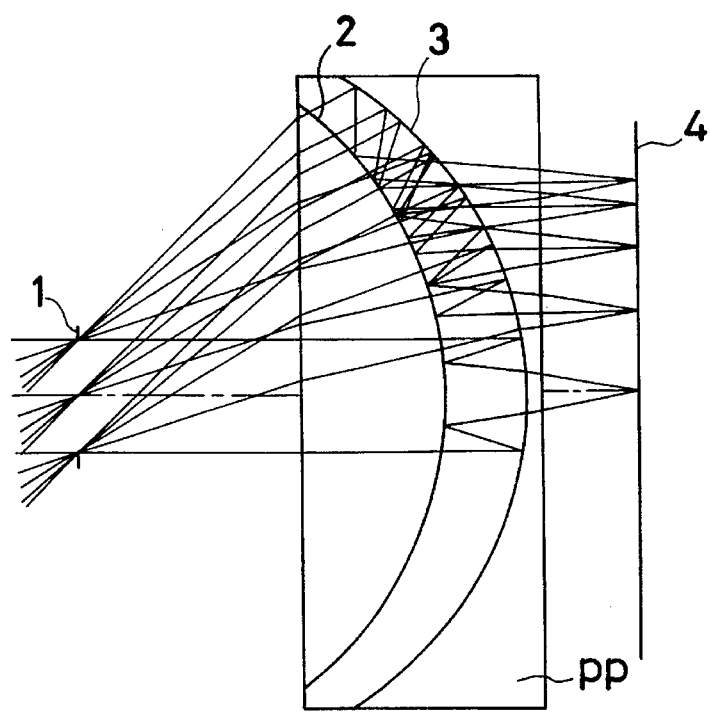
FIG. 10 is a sectional view of a ninth embodiment of the present invention.
Figure 12A:
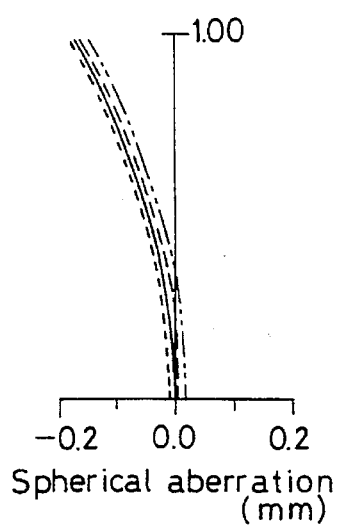
FIGS. 12(a) to 12(d) graphically show various aberrations in the second embodiment in the same way as in FIGS. 11(a) to 11(d).
Figure 12B:
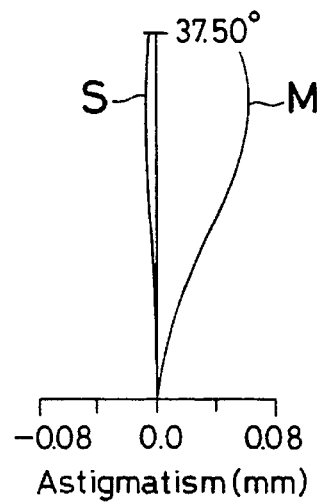
Figure 12C:
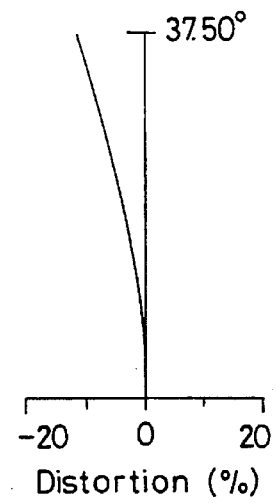
Figure 12D:
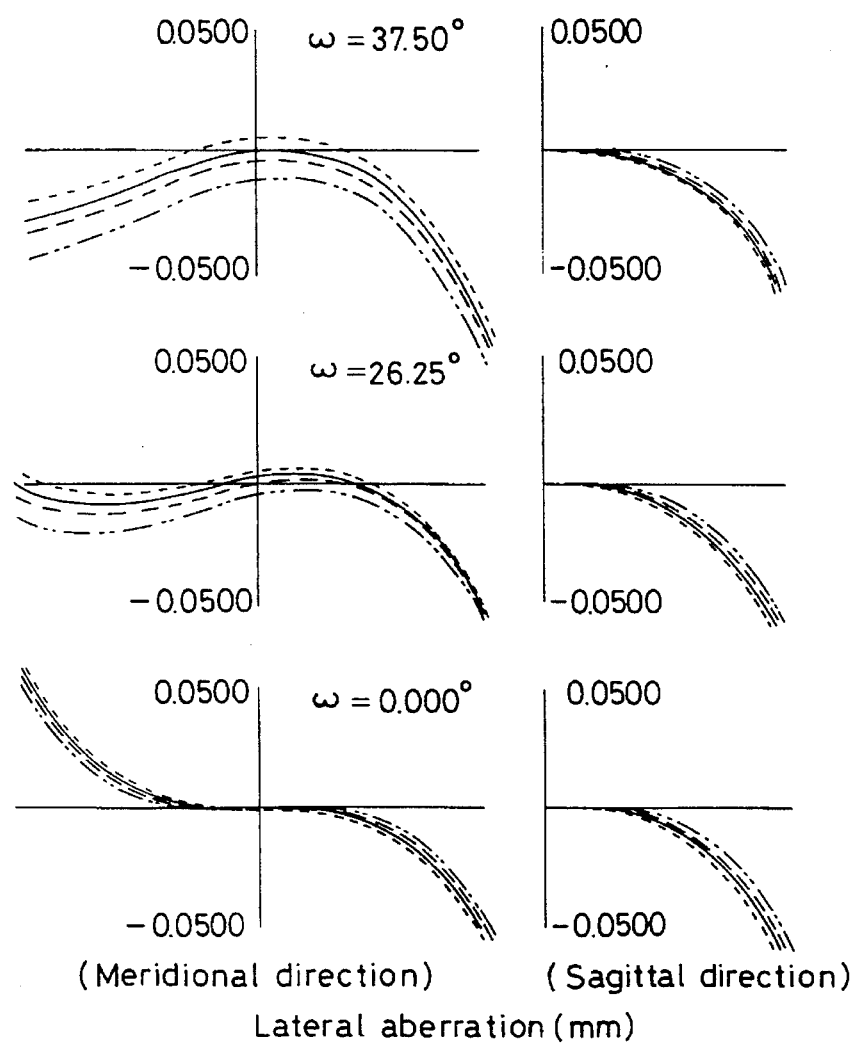
Figure 14A:
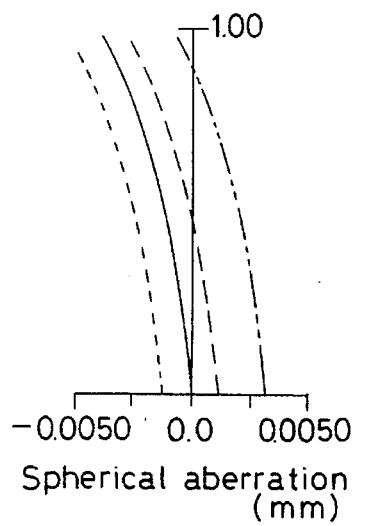
FIGS. 14(a) to 14(d) graphically show various aberrations in the fourth embodiment in the same way as in FIGS. 11(a) to 11(d).
Figure 14B:
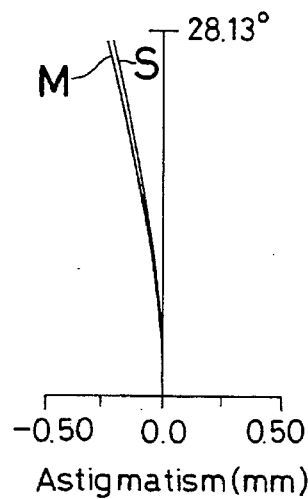
Figure 14C:
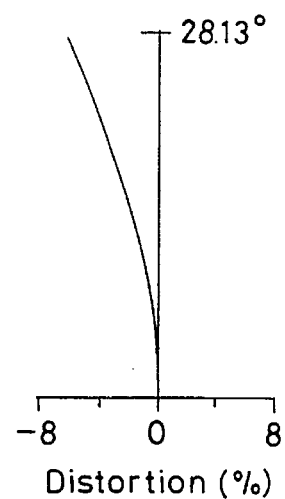
Figure 14D:
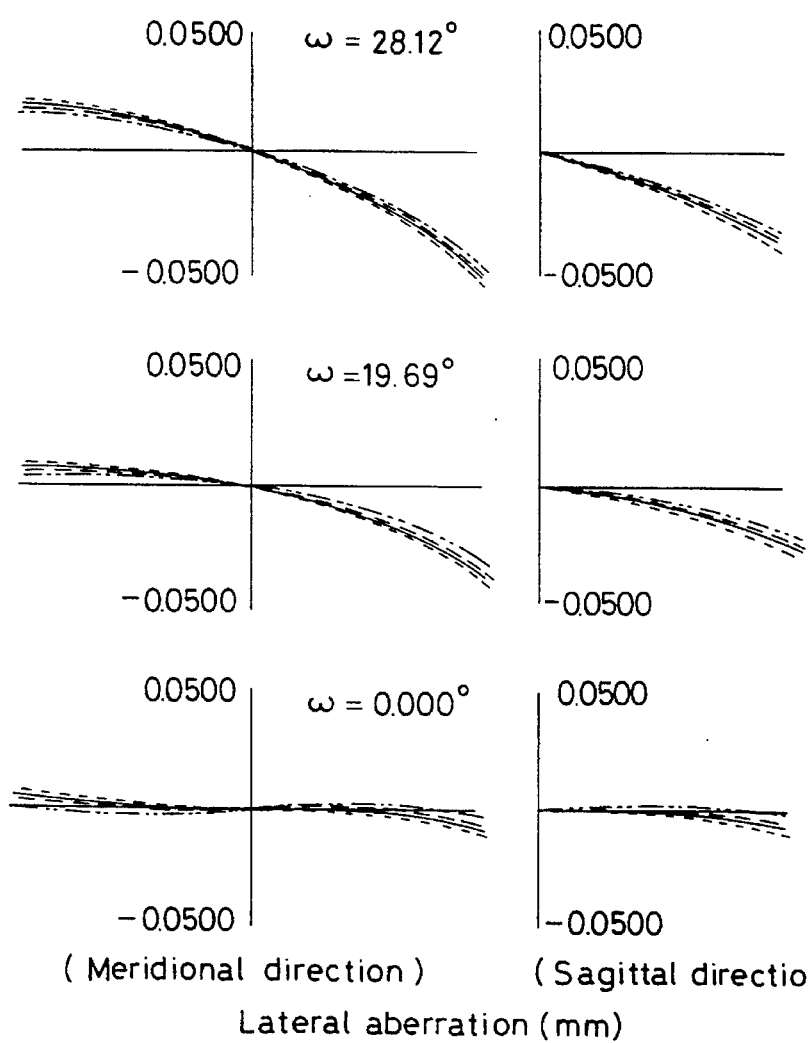
Figure 16A:
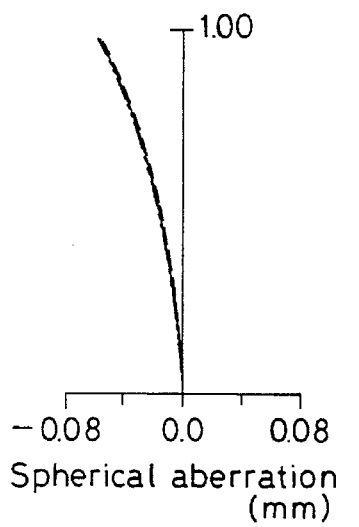
FIGS. 16(a) to 16(d) graphically show various aberrations in the sixth embodiment in the same way as in FIGS. 11(a) to 11(d).
Figure 16B:
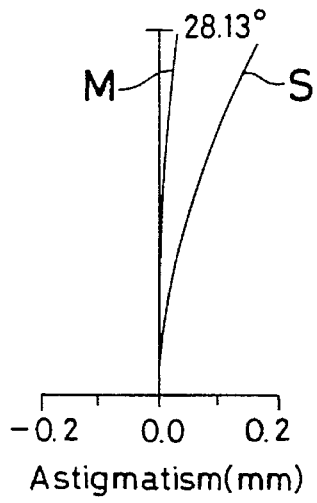
Figure 16C:
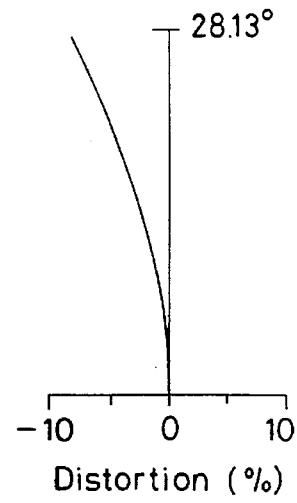
Figure 16D:
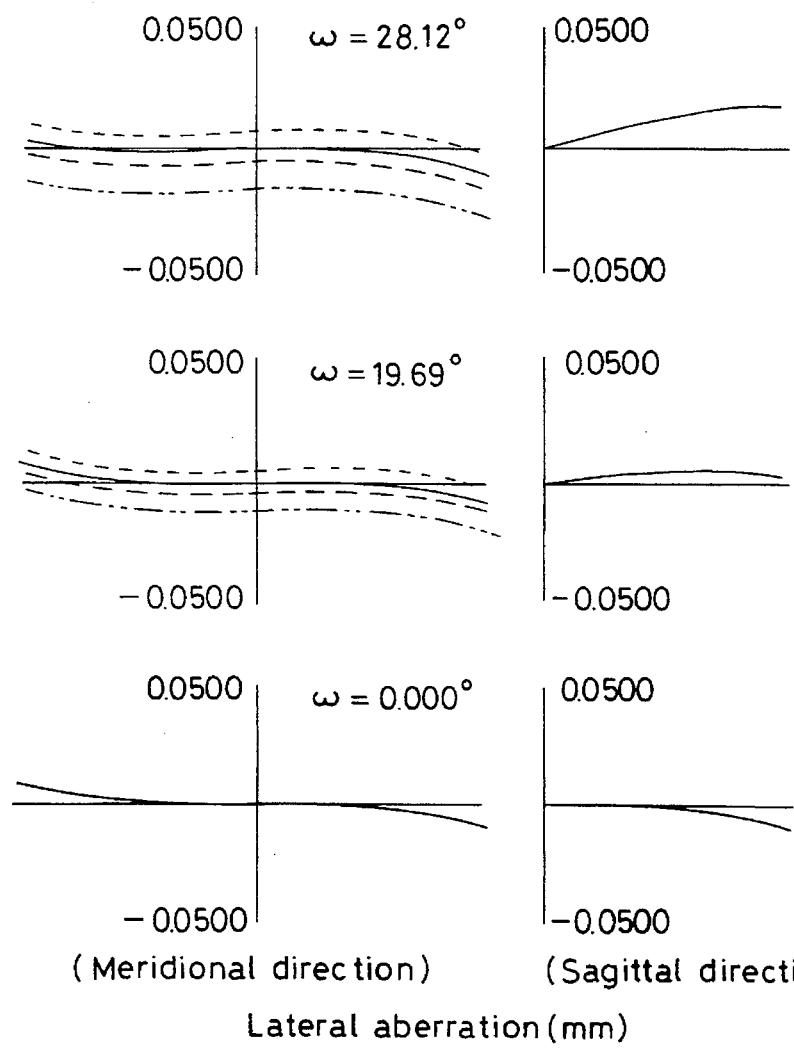
Figure 19A:
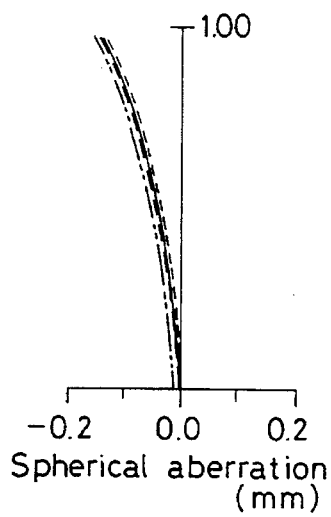
FIGS. 19(a) to 19(d) graphically shows various aberrations in the ninth embodiment in the same way as in FIGS. 11(a) to 11(d).
Figure 19B:
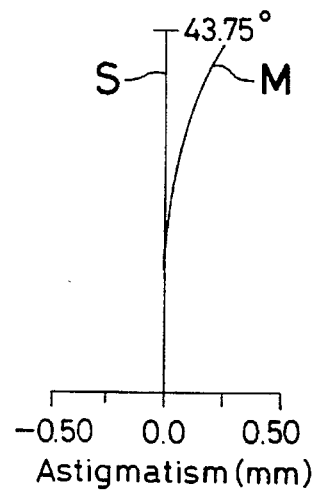
Figure 19C:
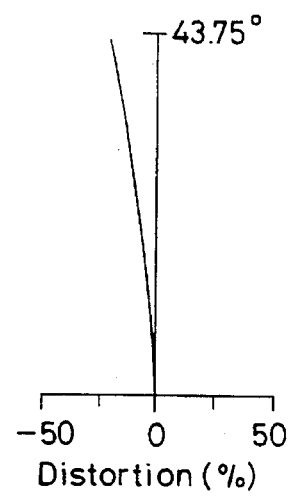
Figure 19D:
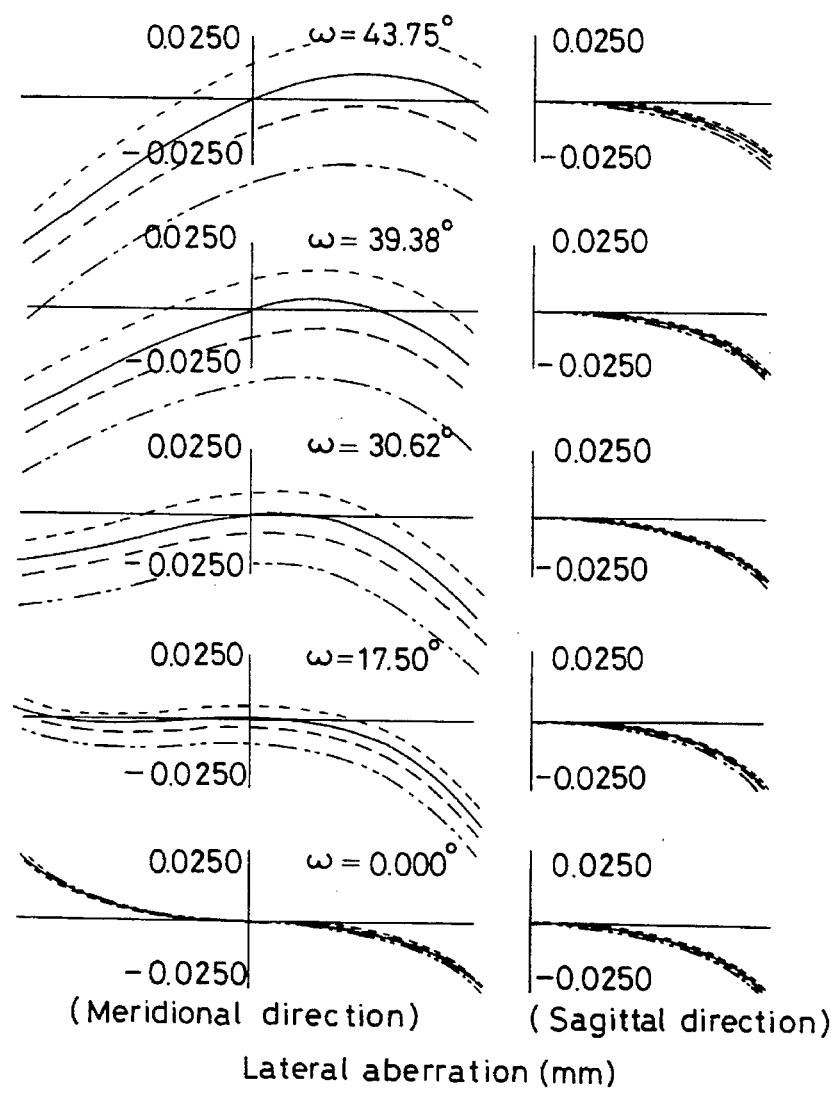

Ninth Embodiment:

A ninth embodiment of the present invention will be explained below with reference to FIG. 10. In the figure, reference numeral 1 denotes a stop position, 2 a first semitransparent reflecting surface, 3 a second semitransparent reflecting surface, and 4 an image surface. In this embodiment, the first and second semitransparent reflecting surfaces 2 and 3 are provided in a plane-parallel plate PP having a single refractive index. Examples of numerical values are shown below. In this embodiment, the angle of view is 70°, the focal length F is 10 mm, and F-number is 2.5.

| Surface No. | Curvature radius | Surface separation | nd | vd |
|---|---|---|---|---|
| 1 | pupil position 1 | 8.255 | | |
| 2 | ∞ | 5.426 | 1.5163 | 64.1 |
| 3 | −12.7792 | 2.822 | 1.5163 | 64.1 |
| 4 | −12.9610 (reflecting surface 3) | −2.822 | 1.5163 | 64.1 |
| 5 | −12.7792 (reflecting surface 2) | 3.322 | 1.5163 | 64.1 |
| 6 | ∞ | 3.455 | | |
| 7 | image surface 4 | | | |

FIGS. 19(a) to 19(d) graphically show various aberrations in this embodiment in the same way as in FIGS. 11(a) to 11(d).

Table below shows values in the foregoing embodiments for the above-described conditions (2) (=(6)), (3), (4), (5), (7) (=(8)), and (9).

| Conditions | (2) | (3) | (4) | (5) | (7) | (9) |
|---|---|---|---|---|---|---|
| Embodiment 1 | 0.84 | 1.48 | 1.14 | 1.40 | 1.09 | 0.28 |
| Embodiment 2 | 0.93 | 1.05 | 1.29 | 0.74 | 1.01 | 0.52 |
| Embodiment 3 | 0.99 | 1.27 | 1.28 | 0.99 | 0.92 | 0.27 |
| Embodiment 4 | 0.80 | 1.34 | 1.20 | 1.17 | 1.31 | 0.56 |
| Embodiment 5 | 1.40 | 0.55 | 1.65 | 0.21 | 0.51 | 0.44 |
| Embodiment 6 | 1.50 | 0.64 | 1.74 | 0.27 | 0.73 | 0.43 |
| Embodiment 7 | 0.75 | 1.09 | 1.17 | 0.89 | 0.92 | 0.57 |
| Embodiment 8 | 1.18 | 0.88 | 1.45 | 0.51 | 1.14 | 0.51 |
| Embodiment 9 | 0.99 | 1.27 | 1.20 | 1.07 | 1.37 | 0.28 |

Figure 20:
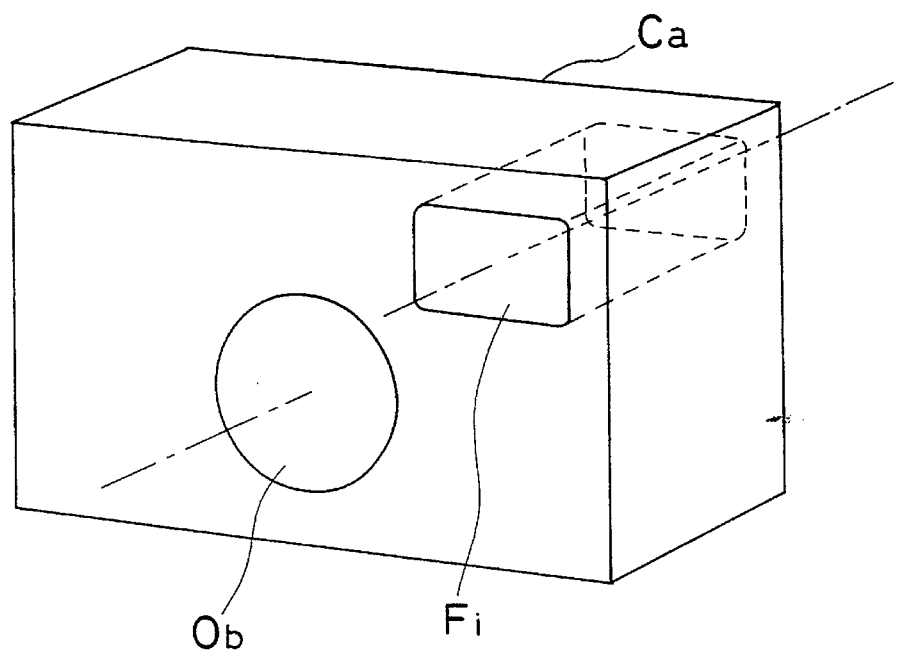
FIG. 20 is a perspective view of an example in which the concentric optical system of the present invention is used as an imaging optical system in a finder optical system of a compact camera.
Figure 21:
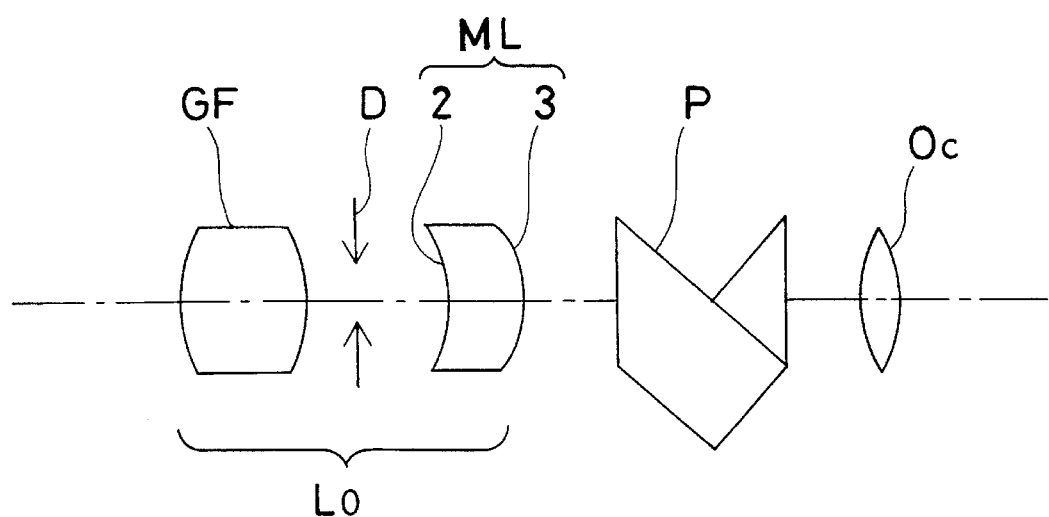
FIG. 21 is a sectional view of an example in which the concentric optical system of the present invention is used as a part of an objective.

It should be noted that the concentric optical system of the present invention may be provided as one lens in an ocular optical system or an imaging optical system. Alternatively, the concentric optical system alone may constitute an ocular optical system or an imaging optical system. Examples of such arrangements will be shown below. The concentric optical system of the present invention may be applied to imaging optical systems as follows: As shown, for example, in the perspective view of FIG. 20, the concentric optical system of the present invention may be used in a finder optical system $F_i$ of a compact camera $C_a$ in which a photographic optical system $O_p$ and the finder optical system $F_i$ are provided separately in substantially parallel to each other. Further, as shown in the sectional view of FIG. 21, a concentric optical system ML of the present invention, which is composed of first and second semitransparent reflecting surfaces 2 and 3, may be disposed behind a front lens group GF and an aperture diaphragm D with their centers of curvature made approximately coincident with the point of intersection of the plane of the diaphragm D and the optical axis, thereby constituting an objective lens system $L_o$. An image that is formed by the objective lens system $L_O$ is erected by a Porro prism erecting system, in which there are four reflections, provided at the observer side of the objective lens system $L_o$, thereby enabling an erect image to be observed through an ocular lens $O_c$.

Further, when used as an imaging optical system, the concentric optical system of the present invention may be arranged as a front-diaphragm optical system.

Figure 22A:
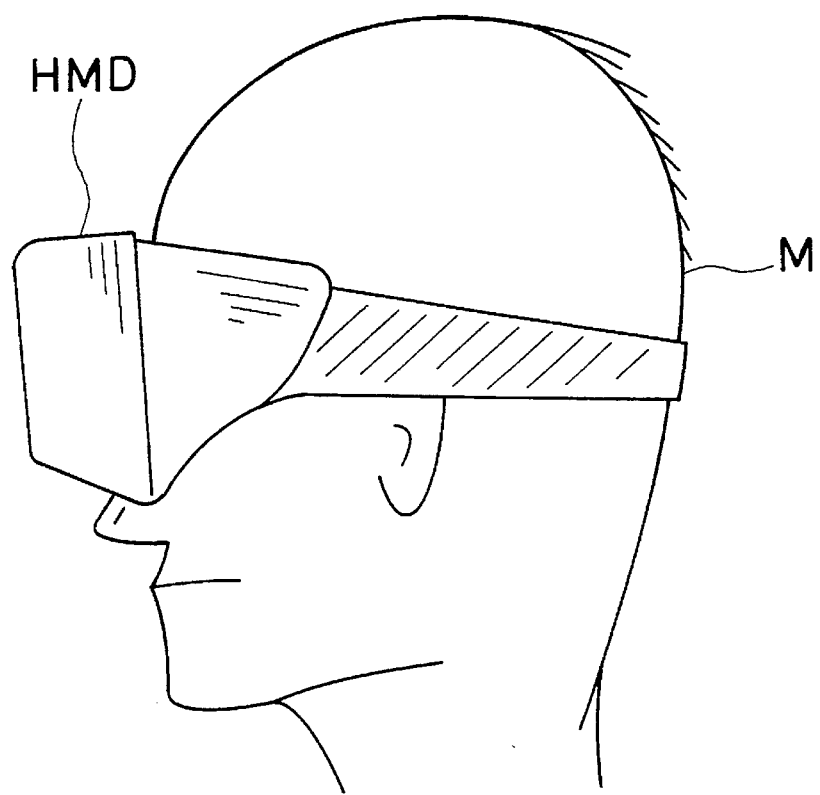
FIG. 22(a) and 22(b) show an example in which the concentric optical system of the present invention is used as an ocular optical system of a head-mounted display system.
Figure 22B:
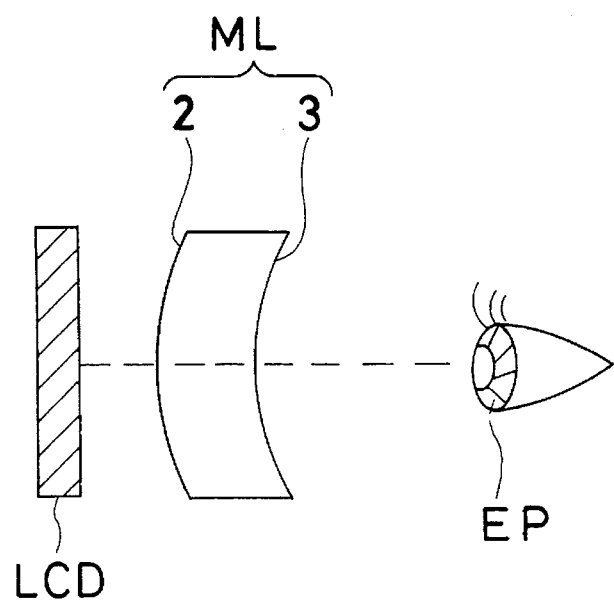
Figure 23:
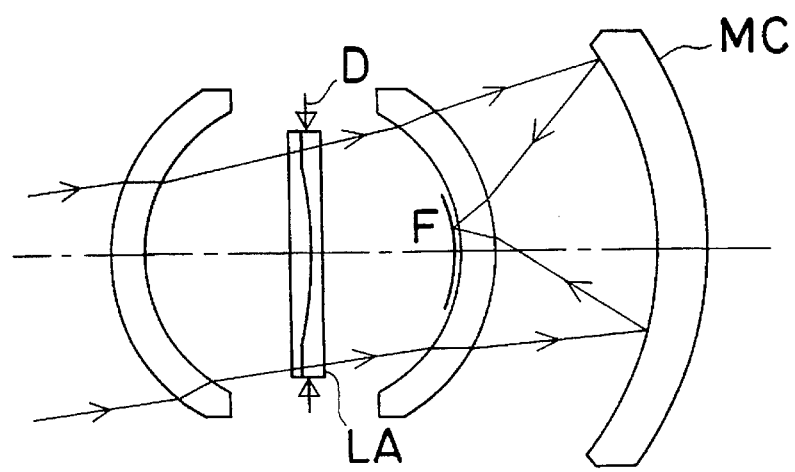
FIG. 23 is a sectional view of a Schmidt system according to a conventional technique.
Figure 24:
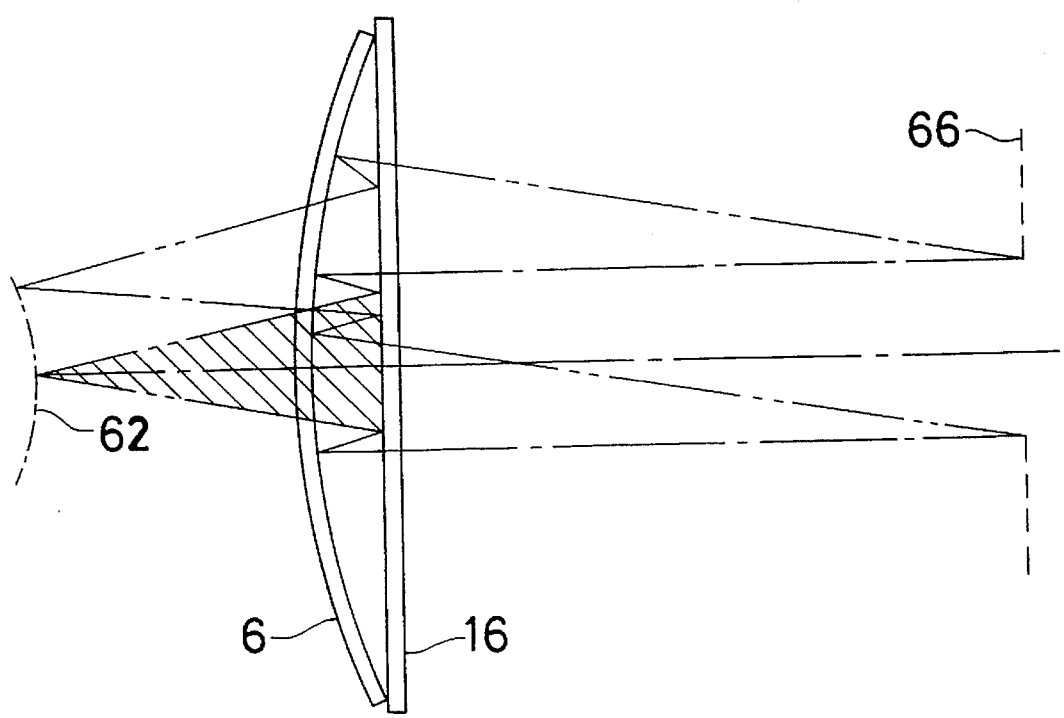
FIG. 24 is a sectional view of an ocular optical system using a semitransparent concave mirror and a semitransparent plane mirror according to a conventional technique.
Figure 25A:
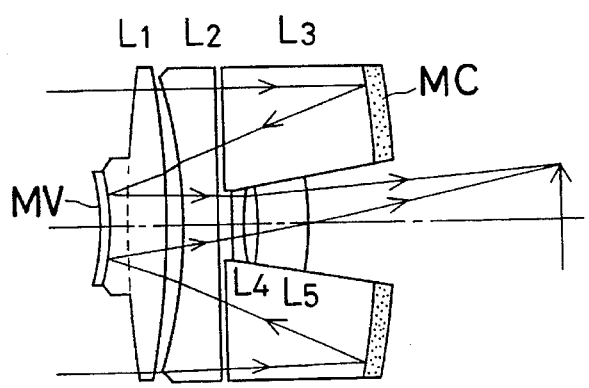
FIGS. 25(a) and 25(b) are sectional views each showing a reflecting telephoto lens according to a conventional technique.
Figure 25B:
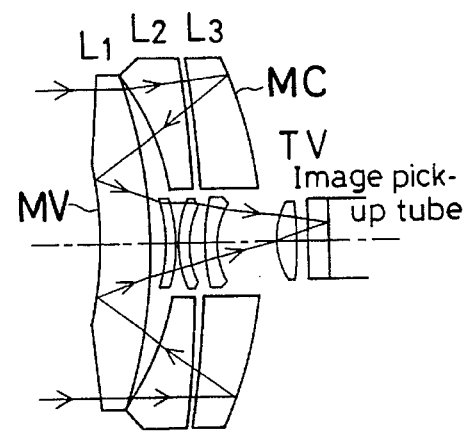

As an ocular optical system, the concentric optical system of the present invention may be used, as shown for example in the perspective view of FIG. 22(a), for a head-mounted display system HMD designed so that a virtual image is projected in an eyeball of an observer M as a magnified image, thereby enabling the observer M to view a virtual aerial magnified image. In this case, as shown in the sectional view of FIG. 22(b), an ocular optical system is comprised of a liquid crystal display device LCD for displaying an image, and a concentric optical system ML of the present invention, which is composed of first and second semitransparent reflecting surfaces 2 and 3. The concentric optical system ML is disposed such that the centers of curvature of the first and second semitransparent reflecting surfaces 2 and 3 lie in the vicinity of an eye point (pupil position) EP on the observer side, in order to project an image displayed on the liquid crystal display device LCD in the observer's eyeball as a magnified image.

As will be clear from the foregoing description, it is possible according to the present invention to obtain a concentric optical system usable as either an imaging optical system or an ocular optical system, which has an F-number of 1.5 to 3 and enables a flat and clear image to be photographed or observed at a view angle of up to 60° or more with substantially no aberration. By using such a concentric optical system, it is possible to provide a head-mounted display system which enables observation of an image that is clear as far as the edges of visual field at a wide presentation view angle.

What we claim is:

1. A concentric optical system comprising:

at least two semitransparent reflecting surfaces each having a center of curvature disposed in the vicinity of a pupil and a concave surface directed toward the pupil, said semitransparent reflecting surfaces being disposed so that each semitransparent reflecting surface passes each particular bundle of light rays at least once and reflects said bundle of light rays at least once, wherein the concentric optical system satisfies the following condition:

$$0.5 < |R_1/R_2| < 1.8 \qquad (2)$$

where $R_1$ is the radius of curvature of the semitransparent reflecting surface closer to said pupil, and $R_2$ is the radius of curvature of the other semitransparent reflecting surface.

2. A concentric optical system comprising:

at least two semitransparent reflecting surfaces each having a center of curvature disposed in the vicinity of a pupil and a concave surface directed toward the pupil, said semitransparent reflecting surfaces being disposed so that each semitransparent reflecting surface passes each particular bundle of light rays at least once and reflects said bundle of light rays at least once, wherein the concentric optical system satisfies the following condition:

$$0.4 < |(D_1+D_2)/R_2| < 1.7 \qquad (3)$$

where $R_2$ is the radius of curvature of the semitransparent reflecting surface farther from said pupil, $D_1$ is the distance from said pupil to the semitransparent reflecting surface closer to said pupil, and $D_2$ is the distance from the semitransparent reflecting surface closer to said pupil to the other semitransparent reflecting surface.

3. A concentric optical system comprising:

at least two semitransparent reflecting surfaces each having a center of curvature disposed in the vicinity of a pupil and a concave surface directed toward the pupil, said semitransparent reflecting surfaces being disposed so that each semitransparent reflecting surface passes each particular bundle of light rays at least once and reflects said bundle of light rays at least once, wherein the concentric optical system satisfies the following condition:

$$1 < |(|R_1|+D_2)/R_2| < 1.8 \qquad (4)$$

where $R_1$ is the radius of curvature of the semitransparent reflecting surface closer to said pupil, $R_2$ is the radius of curvature of the other semitransparent reflecting surface, and $D_2$ is the distance from the semitransparent reflecting surface closer to said pupil to the other semitransparent reflecting surface.

4. A concentric optical system comprising:

at least two semitransparent reflecting surfaces each having a center of curvature disposed in the vicinity of a pupil and a concave surface directed toward the pupil, said semitransparent reflecting surfaces being disposed so that each semitransparent reflecting surface passes each particular bundle of light rays at least once and reflects said bundle of light rays at least once, wherein the concentric Optical system satisfies the following condition:

$$|D_1/R_1| < 1.5 \qquad (5)$$

where $R_1$ is the radius of curvature of the semitransparent reflecting surface closer to said pupil, and $D_1$ is the distance from said pupil to the semitransparent reflecting surface closer to said pupil.

5. A concentric optical system according to claim 3 or 4, wherein, to provide said concentric optical system in an ocular optical system, the centers of curvature of said at least two semitransparent reflecting surfaces are disposed in the vicinity of an eye point with said concave surface directed toward an observer side.

6. A concentric optical system according to claim 1, 2, 3 or 4, wherein, to provide said concentric optical system in an imaging optical system, the centers of curvature of said at least two semitransparent reflecting surfaces are disposed in the vicinity of an aperture diaphragm with said concave surfaces directed toward an object side.

* * * * *